(12) United States Patent
Fan et al.

(10) Patent No.: US 12,495,980 B2
(45) Date of Patent: Dec. 16, 2025

(54) DETECTING HEART RATE VARIABILITY USING A HEARABLE

(71) Applicant: Google LLC, Mountain View, CA (US)

(72) Inventors: Xiaoran Fan, Irvine, CA (US); Trausti Thormundsson, Irvine, CA (US); Richard Edwin Howard, Highland Park, NJ (US)

(73) Assignee: Google LLC, Mountain View, CA (US)

( * ) Notice: Subject to any disclaimer, the term of this patent is extended or adjusted under 35 U.S.C. 154(b) by 58 days.

(21) Appl. No.: 18/602,888

(22) Filed: Mar. 12, 2024

(65) Prior Publication Data

US 2024/0307022 A1    Sep. 19, 2024

Related U.S. Application Data

(63) Continuation of application No. PCT/US2023/064242, filed on Mar. 13, 2023.

(51) Int. Cl.
*A61B 5/024* (2006.01)
*A61B 5/00* (2006.01)
*A61B 5/38* (2021.01)

(52) U.S. Cl.
CPC ............ *A61B 5/02405* (2013.01); *A61B 5/38* (2021.01); *A61B 5/6817* (2013.01); *A61B 2560/0223* (2013.01); *A61B 2562/0204* (2013.01)

(58) Field of Classification Search
CPC .. H04R 1/1008; H04R 1/1016; H04R 1/1083; H04R 1/1091; H04S 7/30–40;
(Continued)

(56) References Cited

U.S. PATENT DOCUMENTS

| 5,105,822 A | 4/1992 | Stevens et al. |
| 7,354,380 B2 | 4/2008 | Volpe |

(Continued)

FOREIGN PATENT DOCUMENTS

| WO | 2010054863 | 5/2010 |
| WO | 2015076916 | 5/2015 |

(Continued)

OTHER PUBLICATIONS

"International Preliminary Report on Patentability", Application No. PCT/US2023/068198, Dec. 10, 2024, 6 pages.
(Continued)

*Primary Examiner* — Carolyn A Pehlke
(74) *Attorney, Agent, or Firm* — Colby Nipper PLLC

(57) ABSTRACT

Techniques and apparatuses are described that perform heart rate variability detection using a hearable. A hearable, such as an earbud, is capable of performing a novel physiological monitoring process termed herein audioplethysmography, which is an active acoustic method capable of sensing subtle physiologically-related changes observable at a user's outer and middle ear. Instead of relying on other auxiliary sensors, such as optical or electrical sensors, audioplethysmography involves transmitting and receiving acoustic signals to monitor a user's biometrics, including heart rate variability and/or blood pressure. In addition to being relatively unobtrusive, some hearables can be configured to support audioplethysmography without the need for additional hardware. As such, the size, cost, and power usage of the hearable can help make health monitoring accessible to a larger group of people and improve the user experience with hearables.

20 Claims, 14 Drawing Sheets

(58) Field of Classification Search
CPC ..... A61B 5/02405; A61B 5/38; A61B 5/6817; A61B 2560/0223; A61B 2562/0204
See application file for complete search history.

(56) References Cited

U.S. PATENT DOCUMENTS

| | | | |
|---|---|---|---|
| 10,873,798 | B1 | 12/2020 | Jackson et al. |
| 11,402,902 | B2 | 8/2022 | Parshionikar |
| 2004/0196992 | A1 | 10/2004 | Ryan |
| 2009/0097689 | A1 | 4/2009 | Prest et al. |
| 2010/0125218 | A1 | 5/2010 | Haartsen et al. |
| 2010/0189269 | A1 | 7/2010 | Haartsen et al. |
| 2014/0051940 | A1 | 2/2014 | Messerschmidt |
| 2019/0022348 | A1 | 1/2019 | Read et al. |
| 2019/0294769 | A1 | 9/2019 | Lesso |
| 2020/0186910 | A1 | 6/2020 | Kemmerer et al. |
| 2020/0187795 | A1 | 6/2020 | Yokoi et al. |
| 2021/0186426 | A1 | 6/2021 | Raju et al. |
| 2021/0275056 | A1 | 9/2021 | Mcmahon et al. |
| 2021/0281943 | A1 | 9/2021 | Lehnert |
| 2022/0087570 | A1 | 3/2022 | Lesso et al. |
| 2022/0183659 | A1 | 6/2022 | Margalit |
| 2022/0386959 | A1 | 12/2022 | Georgiou et al. |
| 2023/0096953 | A1* | 3/2023 | Kuster ................ H04R 1/1083 600/559 |
| 2025/0318800 | A1 | 10/2025 | Fan et al. |

FOREIGN PATENT DOCUMENTS

| | | |
|---|---|---|
| WO | 2016150947 | 9/2016 |
| WO | 2019018750 | 1/2019 |
| WO | 2019152212 | 8/2019 |
| WO | 2019226739 A1 | 11/2019 |
| WO | 2020082387 A1 | 4/2020 |
| WO | 2020130535 A1 | 6/2020 |
| WO | 2021123720 | 6/2021 |
| WO | 2022019442 A1 | 1/2022 |
| WO | 2023240224 | 12/2023 |
| WO | 2023240233 | 12/2023 |
| WO | 2023240240 | 12/2023 |
| WO | 2024191491 A1 | 9/2024 |
| WO | 2024192250 A1 | 9/2024 |
| WO | 2024192386 A1 | 9/2024 |

OTHER PUBLICATIONS

"International Preliminary Report on Patentability", Application No. PCT/US2023/068181, Dec. 10, 2024, 7 pages.
"International Preliminary Report on Patentability", Application No. PCT/US2023/068208, Dec. 20, 2024, 7 pages.
"International Search Report and Written Opinion", Application No. PCT/US2024/020238, Oct. 2, 2024, 21 pages.
"A Research Space for Earable Computing", Retrieved at: https://www.esense.io/—on May 10, 2022, 16 pages.
"Air—Speed of Sound vs. Temperature", Retrieved at: https://www.engineeringtoolbox.com/air-speed-sound-d_603.html—on May 10, 2022, 14 pages.
"Cardioid XLR Lav Microphone", Retrieved at: https://www.movophoto.com/products/lv4-c-xlr-phantom-power-lav-cardioid-mic—on May 10, 2022, 3 pages.
"Finger Pulse Oximeter, (SpO2) Blood Oxygen Saturation Monitor with Pulse Rate Measurements and Pulse Bar Graph, Digital Reading LED Display", Retrieved at: https://santamedical.com/collections/oximeters/products/finger-pulse-oximeter-spo2-blood-oxygen-saturation-monitor-with-pulse-rate-measurements-and-pulse-bar-graph-digital-reading-led-display—on May 10, 2022, 4 pages.
"International Search Report and Written Opinion", Application No. PCT/US2023/068198, Aug. 31, 2023, 10 pages.
"International Search Report and Written Opinion", Application No. PCT/US2023/068208, Aug. 31, 2023, 11 pages.
"International Search Report and Written Opinion", Application No. PCT/US2023/068181, Sep. 4, 2023, 11 pages.
"International Search Report and Written Opinion", Application No. PCT/US2023/064242, Nov. 3, 2023, 21 pages.
"Invitation to Pay Additional Fees and Partial Search Report", Application No. PCT/US2023/064242, Sep. 20, 2023, 13 pages.
"Speed of Sound in Gases", Retrieved at: https://www.betamachinery.com/knowledge-center/speed-of-sound-in-gases-list—on May 10, 2022, 4 pages.
"What is Carbon Dioxide?", Retrieved at: https://www.co2meter.com/blogs/news/10709101-what-is-carbon-dioxide, Dec. 9, 2013, 6 pages.
Amesaka, et al., "Facial Expression Recognition Using Ear Canal Transfer Function", Sep. 19, 2019, 9 pages.
Appelhans, et al., "Heart Rate Variability as an Index of Regulated Emotional Responding", Sep. 2006, pp. 229-240.
Bui, et al., "eBP: A Wearable System For Frequent and Comfortable Blood Pressure Monitoring From User's Ear", Oct. 2019, 17 pages.
Butkow, et al., "Motion-resilient Heart Rate Monitoring with In-ear Microphones", Aug. 2021, 14 pages.
Chamary, JV, "You'll Be Surprised How Often You Actually Touch Your Face", https://www.forbes.com/sites/jvchamary/2020/07/30/coronavirus-face-touching/?sh=442158ae375f, Jul. 30, 2020, 6 pages.
Fan, et al., "Enabling Low-Cost Full Surface Tactile Skin for Human Robot Interaction", Apr. 2022, pp. 1800-1807.
Fan, et al., "HeadFi: Bringing Intelligence to All Headphones", Oct. 2021, 14 pages.
Geisler, et al., "The impact of heart rate variability on subjective well-being is mediated by emotion regulation", Nov. 2010, pp. 723-728.
He, et al., "An Ear-worn Continuous Ballistocardiogram (BCG) Sensor for Cardiovascular Monitoring", Apr. 2015, 15 pages.
Lane, et al., "Neural correlates of heart rate variability during emotion", Jan. 2009, pp. 213-222.
Laskowski, Edwardr., "What's a normal resting heart rate?", Oct. 2, 2020, 4 pages.
Lofqvist, et al., "Speed of Sound Measurements in Gas-Mixtures at Varying Composition Using an Ultrasonic Gas Flow Meter with Silicon Based Transducers", Jan. 1, 2003, 6 pages.
Ma, et al., "OESense: Employing Occlusion Effect for In-ear Human Sensing", Jun. 16, 2021, 13 pages.
Martin, et al., "In-Ear Audio Wearable: Measurement of Heart and Breathing Rates for Health and Safety Monitoring", Jun. 2018, pp. 1256-1263.
Moller, et al., "Transfer Characteristics of Headphones Measured on Human Ears", Apr. 1995, 16 pages.
Nguyen, et al., "A Lightweight And Inexpensive In-ear Sensing System For Automatic Whole-night Sleep Stage Monitoring", Nov. 2016, 15 pages.
Poh, et al., "Cardiovascular monitoring using earphones and a mobile device", Dec. 2012, 9 pages.
Poh, et al., "Heartphones: Sensor Earphones and Mobile Application for Non-obtrusive Health Monitoring", Sep. 2009, pp. 153-154.
Rahman, et al., "How Frequently Do We Touch Facial T-Zone: A Systematic Review", https://www.annalsofglobalhealth.org/articles/10.5334/aogh.2956/, Jul. 6, 2020, 9 pages.
Roddiger, et al., "Towards Respiration Rate Monitoring Using an In-Ear Headphone Inertial Measurement Unit", Sep. 2019, 7 pages.
Rupavatharam, et al., "Towards In-Ear Inertial Jaw Clenching Detection", Sep. 2019, pp. 54-55.
Schafer, Ronaldw., "What is a Savitzky-Golay Filter", Jul. 2011, 7 pages.
Shilko, et al., "Calculation of Pulse Wave Parameters with Account of Blood Vessel Deformation", Jan. 2001, pp. 88-94.
Sissons, Claire, "What to know about patulous eustachian tube", Jun. 12, 2020, 10 pages.
Stein, Phyllisk., "Heart rate variability: a measure of cardiac autonomic tone", May 1994, pp. 1376-1381.
Vogel, et al., "In-Ear Vital Signs Monitoring Using a Novel Microoptic Reflective Sensor", Nov. 2009, pp. 882-889.
Wallburg, Kris, "Control Your AirPods with a Wink or Smile", https://www.macworld.com/article/675759/patent-control-your-airpods-with-a-wink-or-smile.html, Dec. 2, 2020, 4 pages.

(56) References Cited

OTHER PUBLICATIONS

Winokur, et al., "A Wearable Vital Signs Monitor at the Ear for Continuous Heart Rate and Pulse Transit Time Measurements", Apr. 15, 2015, 14 pages.
Winokur, et al., "A Wearable Vital Signs Monitor at the Ear for Continuous Heart Rate and Pulse Transit Time Measurements", Sep. 2012, pp. 2724-2727.
Wong, George, "Speed of Sound in Standard Air", Jan. 28, 1986, 8 pages.
Zhao, et al., "Emotion Recognition using Wireless Signals", Oct. 2016, 14 pages.
"Extended European Search Report", Application No. 24163311.4, Jun. 18, 2024, 11 pages.
"Extended European Search Report", EP Application No. 24162019.4, Jun. 18, 2024, 11 pages.
"International Search Report and Written Opinion", Application No. PCT/US2024/019953, Jul. 4, 2024, 13 pages.
"Invitation to Pay Additional Fees and Partial Search Report", Application No. PCT/US2024/020238, Jul. 11, 2024, 11 pages.
"Two AirPods Max Patents reveal the addition of a new processor and sensors designed to Detect Heart Pathologies", Retrieved at: https://www.patentlyapple.com/2024/03/two-airpods-max-patents-reveal-the-addition-of-a-new-processor-and-sensors-designed-to-detect-heart-pathologies.html—on Jun. 12, 2024, 12 pages.
"International Search Report and Written Opinion", Application No. PCT/US2023/086447, Apr. 12, 2024, 14 pages.
Jin, et al., "EarCommand "Hearing" Your Silent Speech Commands In Ear", Jul. 7, 2022, 28 pages.
Nguyen, et al., "A Scalable and Domain Adaptive Respiratory Symptoms Detection Framework using Earables", Dec. 2021, 6 pages.
Roddiger, et al., "Sensing with Earables", Sep. 7, 2022, 57 pages.
Zhang, et al., "Coughtrigger: Earbuds IMU Based Cough Detection Activator using an Energy-efficient Sensitivity-prioritized Time Series Classifier", May 2022, 5 pages.
Zhang, et al., "EarCough: Enabling Continuous Subject Cough Event Detection on Hearables", Mar. 18, 2023, 6 pages.
"Foreign Office Action", EP Application No. 23738398.9, May 21, 2025, 9 pages.
"International Preliminary Report on Patentability", Application No. PCT/US2023/086447, Sep. 10, 2025, 10 pages.
"International Preliminary Report on Patentability", Application No. PCT/US2024/020238, Sep. 10, 2025, 16 pages.
"International Preliminary Report on Patentability", Application No. PCT/US2024/019953, Sep. 10, 2025, 9 pages.
"Restriction Requirement", U.S. Appl. No. 18/556,853, filed Oct. 30, 2025, 8 pages.

\* cited by examiner

DETECTING HEART RATE VARIABILITY USING A HEARABLE

CROSS-REFERENCE TO RELATED APPLICATION(S)

This application is a continuation of and claims priority to International Patent Application Serial No. PCT/US2023/064242, filed on Mar. 13, 2023, the disclosure of which is incorporated by reference herein in its entirety.

BACKGROUND

Technological advances in medicine and healthcare are making it possible for people to live longer, healthier lives. To further achieve this, individuals have become interested in tracking their personal health. Health monitoring can motivate an individual to realize a particular fitness goal by tracking incremental improvements in the performance of the body's functions. Additionally, the individual can monitor the impact of various chronic illnesses on their body. With active feedback through health monitoring, the individual can live an active and full life with many chronic illnesses and quickly recognize situations in which it is necessary to seek medical attention.

Some devices that support health monitoring, however, can be obtrusive and uncomfortable. As such, people may choose to forego health monitoring if the device negatively impacts their movement or causes inconveniences while performing daily activities. It is therefore desirable for health-monitoring devices to be reliable, portable, and affordable to encourage more users to take advantage of these features.

SUMMARY

Techniques and apparatuses are described that detect heart rate variability using a hearable. Provided according to one or more preferred embodiments is a hearable, such as an earbud, that is capable of performing a novel physiological monitoring process termed herein audioplethysmography, an active acoustic method capable of sensing subtle physiologically-related changes observable at a user's outer and middle ear. Instead of relying on other auxiliary sensors, such as optical or electrical sensors, audioplethysmography involves transmitting and receiving acoustic signals that at least partially propagate within a user's ear canal. To perform audioplethysmography, the hearable forms at least a partial seal in or around the user's outer ear. This seal enables formation of an acoustic circuit, which includes the seal, the hearable, the ear canal, and an ear drum of the ear. By transmitting and receiving acoustic signals, the hearable can recognize changes in the acoustic circuit to monitor a user's biometrics, including heart rate variability and/or blood pressure. In addition to being relatively unobtrusive, some hearables can be configured to support audioplethysmography without the need for additional hardware. As such, the size, cost, and power usage of the hearable can help make health monitoring accessible to a larger group of people and improve the user experience with hearables.

Aspects described below include a method associated with determining heart rate variability using a hearable. The method includes transmitting an acoustic transmit signal that propagates within at least a portion of an ear canal of a user. The method also includes receiving an acoustic receive signal. The acoustic receive signal represents a version of the acoustic transmit signal with one or more characteristics modified due to the propagation within the ear canal. The method additionally includes determining a heart rate variability of the user based on the one or more modified characteristics of the acoustic receive signal.

Aspects described below include a another method associated with determining heart rate variability using a hearable. The method includes transmitting a first acoustic transmit signal that propagates within at least a portion of an ear canal of a user. The first acoustic transmit signal has multiple tones. The method also includes receiving an acoustic receive signal. The acoustic receive signal represents a version of the first acoustic transmit signal with one or more characteristics modified due to the propagation within the ear canal. The method additionally includes selecting a subset of the multiple tones based on the one or more modified characteristics of the acoustic receive signal. The method further includes transmitting a second acoustic signal having the subset of the multiple tones.

Aspects described below include a system with means for determining heart rate variability using a hearable.

BRIEF DESCRIPTION OF DRAWINGS

Apparatuses for and techniques that facilitate detecting heart rate variability using a hearable are described with reference to the following drawings. The same numbers are used throughout the drawings to reference like features and components:

FIG. 1-2 illustrates an example geometric change in an ear canal, which can be detected using audioplethysmography;

FIG. 2 illustrates an example implementation of a smart device;

FIG. 4-1 illustrates example operations of two hearables performing single-ear audioplethysmography;

FIG. 4-2 illustrates an example joint operation of two hearables performing two-ear audioplethysmography;

DETAILED DESCRIPTION

Figure 1:
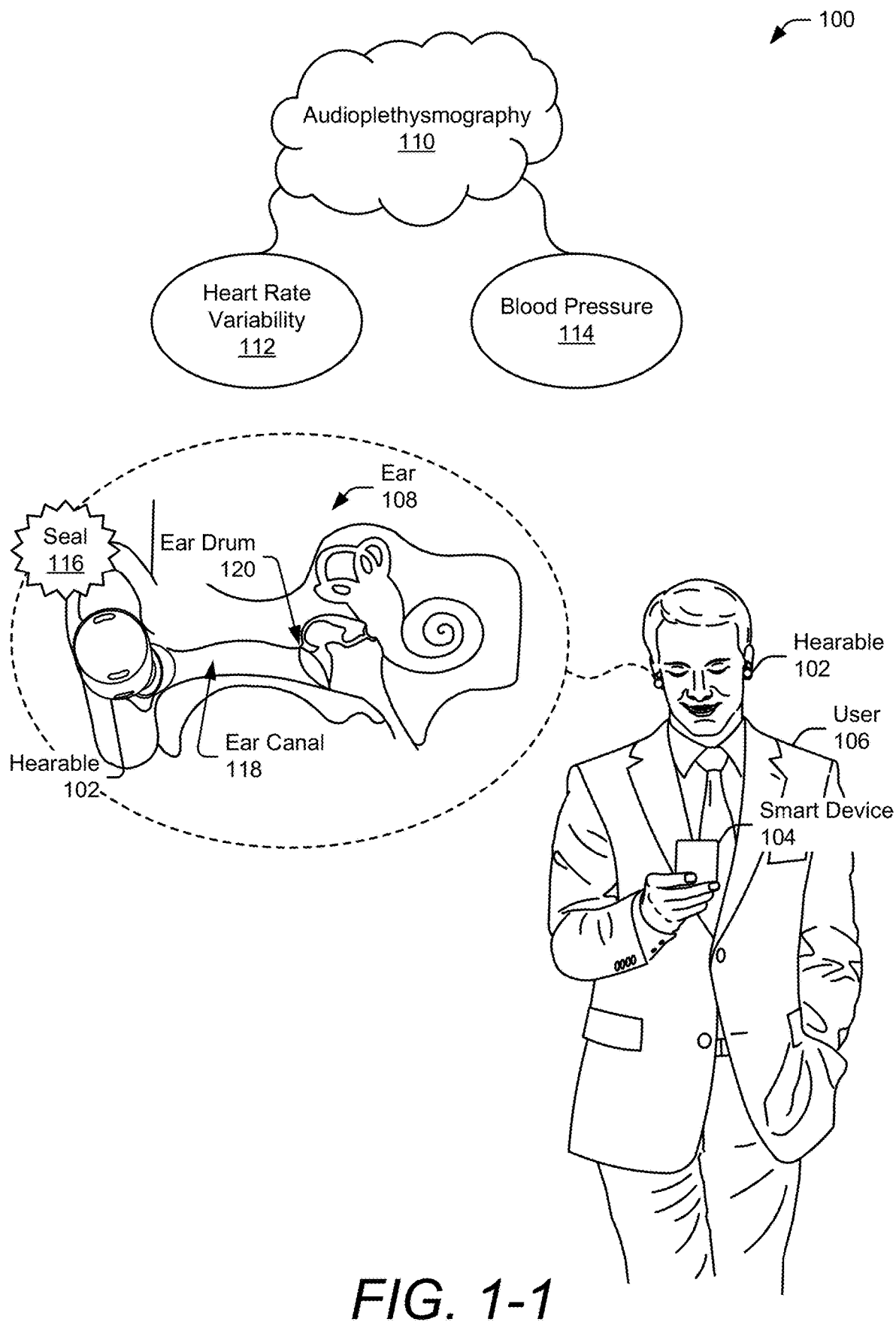
FIG. 1-1 illustrates an example environment in which audioplethysmography can be implemented.
Figure 1:
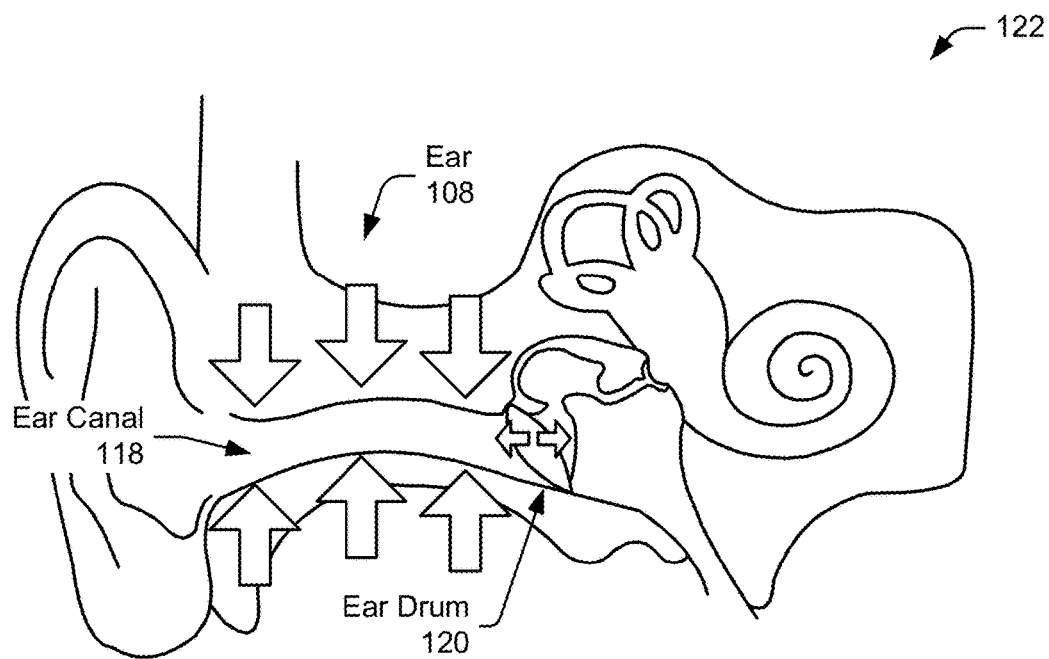

Technological advances in medicine and healthcare are making it possible for people to live longer, healthier lives. To further achieve this, individuals have become interested in tracking their personal health. Health monitoring can motivate an individual to realize a particular fitness goal by tracking incremental improvements in the performance of the body's functions. Additionally, the individual can use health monitoring to observe changes in the body caused by chronic illnesses. With active feedback through health monitoring, the individual can live an active and full life with many chronic illnesses and recognize situations in which it is necessary to quickly seek medical attention.

Some health monitoring devices, however, can be obtrusive and uncomfortable. To measure carbon dioxide levels, for example, some devices take a sample of blood from the user. Other devices may utilize auxiliary sensors, including optical or electronic sensors, that add additional weight, cost, complexity, and/or bulk. Still other devices may require constant recharging of a battery due to relatively high power usage. As such, people may choose to forego health monitoring if the health monitoring device negatively impacts their movement or causes inconveniences while performing daily activities. It is therefore desirable for health monitoring devices to be reliable, portable, efficient, and affordable to expand accessibility to more users.

Wireless technology has become prevalent in everyday life, making communication and data readily accessible to users. One type of wireless technology are wireless hearables, examples of which include wireless earbuds and wireless headphones. Wireless hearables have allowed users freedom of movement while listening to audio content from music, audio books, podcasts, and videos. With the prevalence of wireless hearables, there is a market for adding additional features to existing hearables utilizing current hardware (e.g., without introducing any new hardware).

To address this challenge and provide new features for existing hearables, techniques are described that detect heart rate variability using a hearable. Provided according to one or more preferred embodiments is a hearable, such as an earbud, that is capable of performing a novel physiological monitoring process termed herein audioplethysmography, an active acoustic method capable of sensing subtle physiologically-related changes observable at a user's outer and middle ear. Instead of relying on other auxiliary sensors, such as optical or electrical sensors, audioplethysmography involves transmitting and receiving acoustic signals that at least partially propagate within a user's ear canal. To perform audioplethysmography, the hearable forms at least a partial seal in or around the user's outer ear. This seal enables formation of an acoustic circuit, which includes the seal, the hearable, the ear canal, and an ear drum of the ear. By transmitting and receiving acoustic signals, the hearable can recognize changes in the acoustic circuit to monitor a user's biometrics, including heart rate variability and/or blood pressure. In addition to being relatively unobtrusive, some hearables can be configured to support audioplethysmography without the need for additional hardware. As such, the size, cost, and power usage of the hearable can help make health monitoring accessible to a larger group of people and improve the user experience with hearables.

It can be challenging to detect heart rate variability, which represents a shift in timing between heart beats. Cardiac activity in general may modulate approximately one percent or less of an acoustic signal. This modulation can occur within an amplitude of the acoustic signal, within a phase of the acoustic signal, or within both the amplitude and the phase of the acoustic signal. In many situations, the modulation of the acoustic signal by the cardiac activity can be obscured by noise and may not be directly measurable from a raw version of the acoustic signal. Also, various conditions can impact the signal-to-noise ratio for audioplethysmography. For example, a wear of the hearable (e.g., insertion depth and/or rotation), a physical structure of the user's ear canal, a response characteristic of the hearable (e.g., speaker, microphone, and/or housing), and a frequency of the acoustic transmit signal can impact an intensity at which cardiac activities modulate the acoustic signal.

To further address these challenges, the techniques for detecting heart rate variability can include performing a calibration procedure that evaluates current conditions to select one or more tones (or frequencies) that enable cardiac activity to be detected in the presence of noise. As part of the calibration procedure, the hearable transmits an acoustic signal having multiple tones. During a measurement procedure, the hearable uses audioplethysmography to transmit an acoustic signal having one or more tones that are selected based on the calibration procedure. The acoustic signal associated with the measurement procedure has fewer tones compared to the acoustic signal associated with the calibration procedure. With fewer tones, the acoustic signal associated with the measurement procedure can have a higher amplitude at the selected tones compared to the amplitude of the acoustic signal associated with the calibration procedure at the multiple tones for a given output power of the hearable. Also, the acoustic signal associated with the measurement procedure can have a longer duration at each of the selected tones compared to the duration of the acoustic signal associated with the calibration procedure at the multiple tones for a given time interval. The higher amplitude and longer duration can further improve the signal-to-noise ratio and, by extension, an accuracy of the heart rate variability measurement.

Operating Environment

FIG. 1-1 is an illustration of an example environment 100 in which heart rate variability detection using a hearable can be implemented. In the example environment 100, a hearable 102 is connected to a smart device 104 using a physical or wireless interface. The hearable 102 is a device that can play audible content provided by the smart device 104 and direct the audible content into a user 106's ear 108. In this example, the hearable 102 operates together with the smart device 104. In other examples, the hearable 102 can operate or be implemented as a stand-alone device. Although depicted as a smartphone, the smart device 104 can include other types of devices, including those described with respect to FIG. 2.

The hearable 102 is capable of performing audioplethysmography 110, which is an acoustic method of sensing that occurs at the ear 108. The hearable 102 can perform this sensing without the use of other auxiliary sensors, such as an optical sensor or an electrical sensor. Through audioplethysmography 110, the hearable 102 can perform detect (or measure) heart rate variability 112 and/or blood pressure 114. Heart rate variability 112 is a shift in timing between heart beats and can reflect a physiological state and/or an emotional state of the user 106. For example, heart rate variability 112 can indicate a heart condition or a mental health issue such as anxiety or depression. Blood pressure 114 represents an amount of force applied against arterial walls by blood that is pumped via the heart. Many vital organs, including the heart, kidneys, and brain, can be damaged if the blood pressure 114 is too high. With audioplethysmography 110, the user 106 can actively monitor their health and take appropriate action based on any changes in their heart rate variability 112 and/or blood pressure 114 to live a longer and healthier life.

To use audioplethysmography 110, the user 106 positions the hearable 102 in a manner that creates at least a partial seal 116 around or in the ear 108. Some parts of the ear 108 are shown in FIG. 1, including an ear canal 118 and an ear drum 120 (or tympanic membrane). Due to the seal 116, the hearable 102, the ear canal 118, and the ear drum 120 couple together to form an acoustic circuit. Audioplethysmography 110 involves, at least in part, measuring properties associated with this acoustic circuit. The properties of the acoustic circuit can change due to a variety of different situations or actions.

Figure 2:
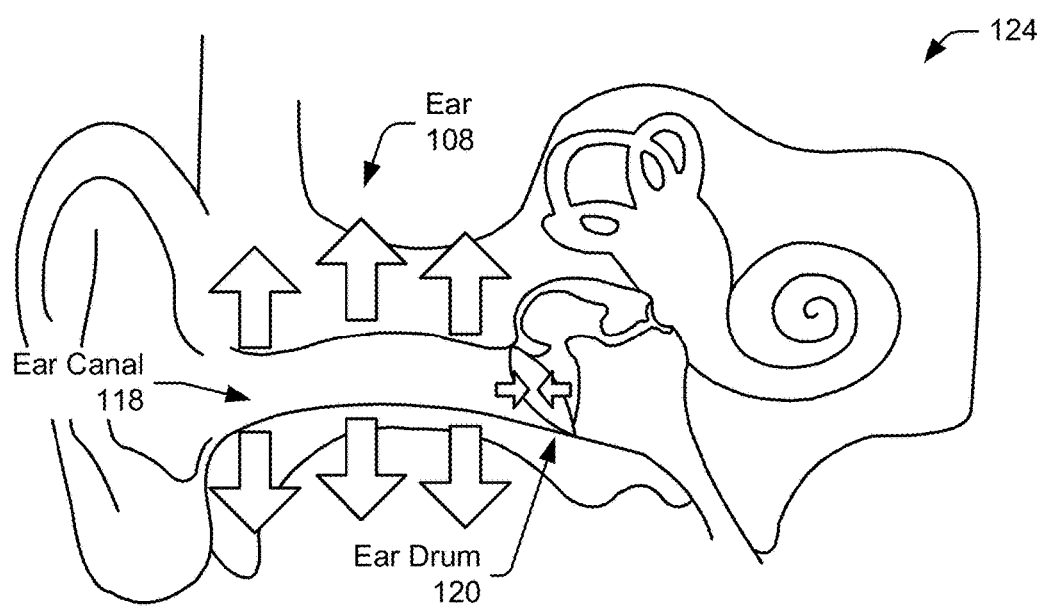
Figure 2:
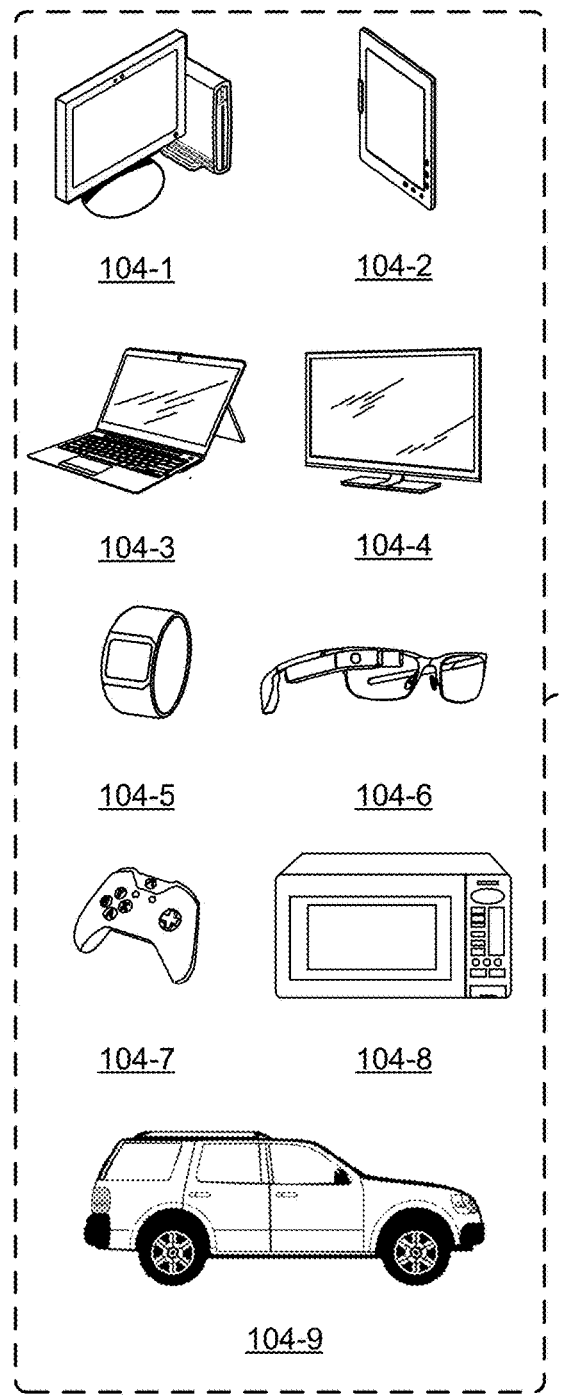
Figure 2:
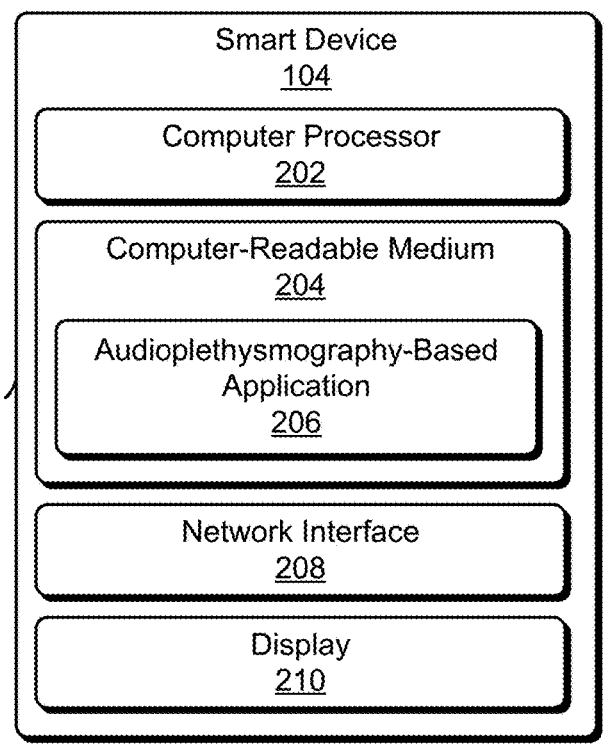

For example, consider FIG. 1-2 in which a change occurs in a physical structure of the ear 108. Example changes to the physical structure include a change in a geometric shape of the ear canal 118 and/or a change in a volume of the ear canal 118. This change can be caused, at least in part, by subtle blood vessel deformations in the ear canal 118 caused by the user 106's heart pumping. Other changes can also can be caused by movement in the ear drum 120 or movement of the user 106's jaw.

At 122, for instance, the tissue around the ear canal 118 and the ear drum 120 itself are slightly "squeezed" due to blood vessel deformation. This squeeze causes a volume of the ear canal 118 to be slightly reduced at 122. At 124, however, the squeezing subsides and the volume of the ear canal 118 is slightly increased relative to 122. The physical changes within the ear 108 can modulate an amplitude and/or phase of an acoustic signal that propagates through the ear canal 118, as further described below.

During audioplethysmography 110, an acoustic signal propagates through at least a portion of the ear canal 118. The hearable 102 can receive an acoustic signal that represents a superposition of multiple acoustic signals that propagate along different paths within the ear canal 118. Each path is associated with a delay ($\Sigma$) and an amplitude (a). The delay and amplitude can vary over time due to the subtle changes that occur in the volume of the ear canal 118. The received acoustic signal can be represented by Equation 1:

$$S(t) = n + \sum_{i=1}^{N-1} a_i(t)\cos\ (\varphi_{ini} + \Omega_{fc}(t + \tau_i(t)))  \quad \text{Equation 1}$$

where S(t) represents the received acoustic signal, n represents noise, $\varphi_{ini}$ represents a relative phase between the received acoustic signal and the transmitted acoustic signal, $\Omega_{fc}$ represents a frequency of the transmitted acoustic signal, and t represents a time vector. Cardiac activities of the user 106 can modulate the amplitude and/or phase of the receive acoustic signal, as further shown in Equation 2:

$$S(t) = n + (1 + h_{amp}(t))\ \cos\ (h_{phase}(t) + \varphi_{ini} + +\Omega_{fc}(t))  \quad \text{Equation 2}$$

where $h_{amp}(t)$ represents an amplitude modulator and $h_{phase}(t)$ represents a phase modulator. The interactions between the hearable 102 and the ear 108 as well as the physiological activities of the user 106 modulate the amplitude and phase of the received acoustic signal. The techniques for audioplethysmography 110 can be performed while the hearable 102 is playing audible content to the user 106. The smart device 104 is further described with respect to FIG. 2.

FIG. 2 illustrates an example smart device 104. The smart device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a baby monitor, a Wi-Fi™ router, a drone, a trackpad, a drawing pad, a netbook, an e-reader, a home automation and control system, a wall display, and another home appliance. Note that the smart device 104 can be wearable, non-wearable but mobile, or relatively immobile (e.g., desktops and appliances).

The smart device 104 includes one or more computer processors 202 and at least one computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes an audioplethysmography-based application 206, which uses information provided by the hearable 102 to perform an action. Example actions can include displaying data associated with heart rate variability 112 and/or blood pressure 114 to the user 106.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, Bluetooth®, and the like. The smart device 104 may also include the display 210. Although not explicitly shown, the hearable 102 can be integrated within the smart device 104, or can connect physically or wirelessly to the smart device 104. The hearable 102 is further described with respect to FIG. 3.

Figure 3:
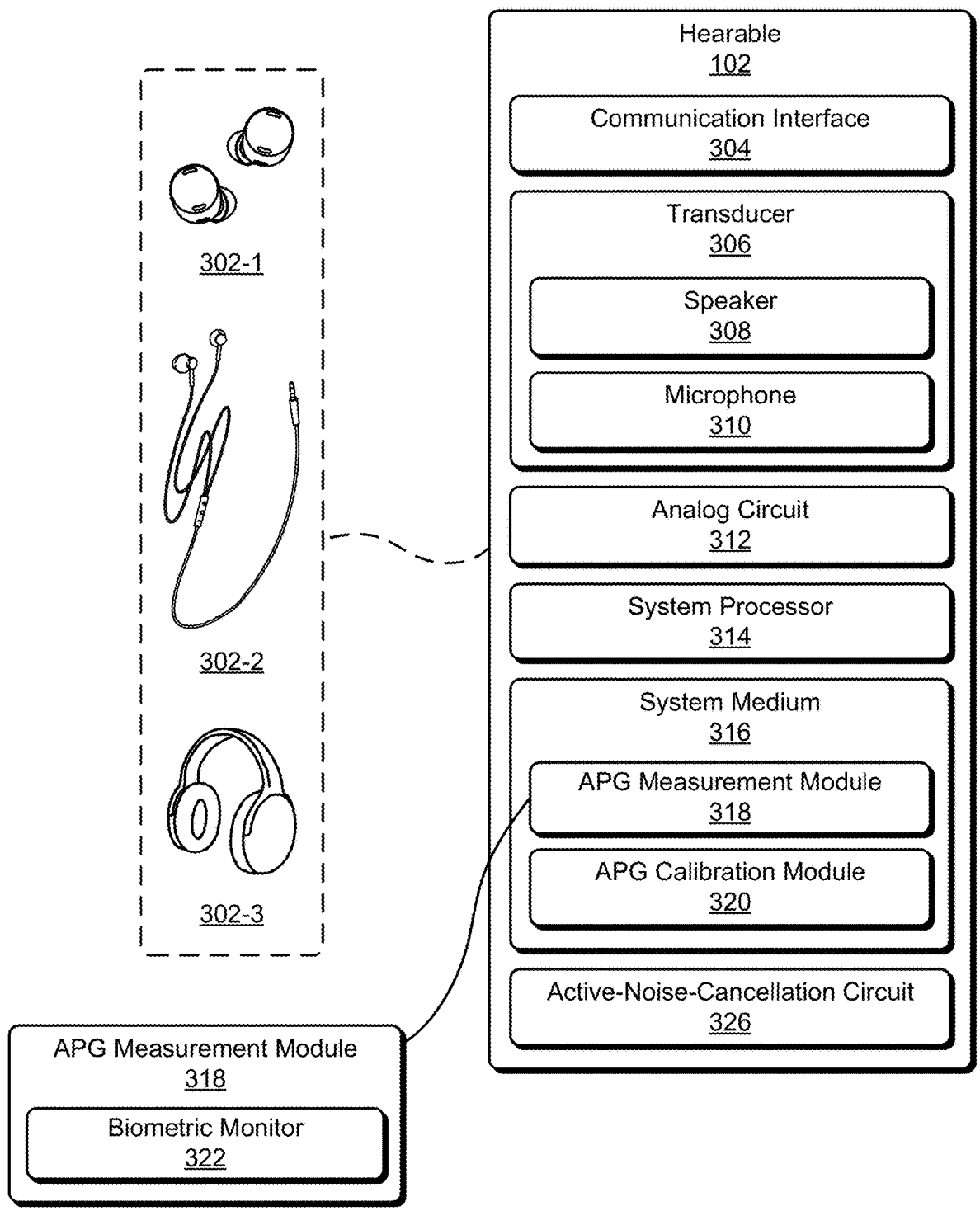
FIG. 3 illustrates an example implementation of a hearable.

FIG. 3 illustrates an example hearable 102. The hearable 102 is illustrated with various non-limiting example devices, including wireless earbuds 302-1, wired earbuds 302-2, and headphones 302-3. The earbuds 302-1 and 302-2 are a type of in-ear device that fits into the ear canal 118. Each earbud 302-1 or 302-2 can represent a hearable 102. Headphones 302-3 can rest on top of or over the ears 108. The headphones 302-3 can represent closed-back headphones, open-back headphones, on-ear headphones, or over-ear headphones. Each headphone 302-2 includes two hearables 102, which are physically packaged together. In general, there is one hearable 102 for each ear 108.

The hearable 102 includes a communication interface 304 to communicate with the smart device 104, though this need not be used when the hearable 102 is integrated within the smart device 104. The communication interface 304 can be a wired interface or a wireless interface, in which audio content is passed from the smart device 104 to the hearable 102. The hearable 102 can also use the communication interface 304 to pass data measured using audioplethysmography 110 to the smart device 104. In general, the data provided by the communication interface 304 is in a format usable by the audioplethysmography-based application 206. The communication interface 304 also enables the hearable 102 to communicate with another hearable. During bistatic sensing, for instance, the hearable 102 can use the communication interface 304 to coordinate with the other hearable to support two-ear audioplethysmography 110, as further described with respect to FIG. 4-2. In particular, the transmitting hearable 102 can communicate timing and waveform information to the receiving hearable 102 to enable the receiving hearable 102 to appropriately demodulate a received acoustic signal.

The hearable 102 includes at least one transducer 306 that can convert electrical signals into sound waves. The transducer 306 can also detect and convert sound waves into electrical signals. These sound waves may include ultrasonic frequencies and/or audible frequencies, either of which may be used for audioplethysmography 110. In particular, a frequency spectrum (e.g., range of frequencies) that the transducer 306 uses to generate an acoustic signal can include frequencies from a low-end of the audible range to a high-end of the ultrasonic range, e.g., between 20 hertz (Hz) to 2 megahertz (MHZ). Other example frequency spectrums for audioplethysmography 110 can encompass frequencies between 20 Hz and 20 kilohertz (kHz), between 20 kHz and 2 MHz, between 20 and 60 kHz, or between 30 and 40 KHz.

In an example implementation, the transducer 306 has a monostatic topology. With this topology, the transducer 306 can convert the electrical signals into sound waves and convert sound waves into electrical signals (e.g., can transmit or receive acoustic signals). Example monostatic transducers may include piezoelectric transducers, capacitive transducers, and micro-machined ultrasonic transducers (MUTs) that use microelectromechanical systems (MEMS) technology.

Alternatively, the transducer 306 can be implemented with a bistatic topology, which includes multiple transducers that are physically separate. In this case, a first transducer converts the electrical signal into sound waves (e.g., transmits acoustic signals), and a second transducer converts sound waves into an electrical signal (e.g., receives the acoustic signals). An example bistatic topology can be implemented using at least one speaker 308 and at least one microphone 310. The speaker 308 and the microphone 310 can be dedicated for audioplethysmography 110 or can be used for both audioplethysmography 110 and other functions of the smart device 104 (e.g., presenting audible content to the user 106, capturing the user 106's voice for a phone call, or for voice control).

In general, the speaker 308 and the microphone 310 are directed towards the ear canal 118 (e.g., oriented towards the ear canal 118). Accordingly, the speaker 308 can direct acoustic signals towards the ear canal 118, and the microphone 310 is responsive to receiving acoustic signals from the direction associated with the ear canal 118.

The hearable 102 includes at least one analog circuit 312, which includes circuitry and logic for conditioning electrical signals in an analog domain. The analog circuit 312 can include analog-to-digital converters, digital-to-analog converters, amplifiers, filters, mixers, and switches for generating and modifying electrical signals. In some implementations, the analog circuit 312 includes other hardware circuitry associated with the speaker 308 or microphone 310.

The hearable 102 also includes at least one system processor 314 and at least one system medium 316 (e.g., one or more computer-readable storage media). In the depicted configuration, the system medium 316 includes an audioplethysmography measurement module 318 (APG measurement module 318) and optionally includes an audioplethysmography calibration module 320 (APG calibration module 320). The audioplethysmography measurement module 318 and the audioplethysmography calibration module 320 can be implemented using hardware, software, firmware, or a combination thereof. In this example, the system processor 216 implements the audioplethysmography measurement module 318 and the audioplethysmography calibration module 320. In an alternative example, the computer processor 202 of the smart device 104 can implement at least a portion of the audioplethysmography measurement module 318 and/or the audioplethysmography calibration module 320. In this case, the hearable 102 can communicate digital samples of the acoustic signals to the smart device 104 using the communication interface 304.

The audioplethysmography measurement module 318 analyzes receive acoustic signals to measure data associated with audioplethysmography 110. The audioplethysmography measurement module 318 can be implemented using a biometric monitor 322, which can detect heart rate variability 112 and/or blood pressure 114. The measurement procedure is further described with respect to FIG. 5. An example audioplethysmography measurement module 318 is further described with respect to FIG. 8.

The audioplethysmography calibration module 320 can determine appropriate characteristics (e.g., waveform or signal characteristics) of transmitted acoustic signals to improve audioplethysmography 110 performance. For example, the audioplethysmography calibration module 320 can take into account the wear of the hearable 102 (e.g., the position of the hearable 102 relative to the ear canal 118) and the physical structure of the ear canal 118 to determine a transmission frequency that can enable the hearable 102 to detect the user 106's heart rate variability 112 and/or blood pressure 114 with an accuracy of 95% or more. With the audioplethysmography calibration module 320, the hearable 102 can dynamically adjust the transmission frequency each time the seal 116 is formed (e.g., based on the wear of the hearable 102) and based on the unique physical structure of the ear 108. Through this calibration procedure, the hearables 102 on different ears 108 may operate with one or more different acoustic frequencies. The calibration procedure is further described with respect to FIG. 5. An example implementation of the audioplethysmography calibration module 320 is further described with respect to FIG. 6.

Some hearables 102 include an active-noise-cancellation circuit 326, which enables the hearables 102 to reduce background or environmental noise. In this case, the microphone 310 used for audioplethysmography 110 can be implemented using a feedback microphone of the active-noise-cancellation circuit 326. During active noise cancellation, the feedback microphone provides feedback information regarding the performance of the active noise cancellation. During audioplethysmography 110, the feedback microphone receives an acoustic signal, which is provided to the audioplethysmography measurement module 318 and/or the audioplethysmography calibration module 320. In some situations, active noise cancellation and audioplethysmography 110 are performed simultaneously using the feedback microphone. In this case, the acoustic signal received by the feedback microphone can be provided to at least one of the audioplethysmography modules 318 or 320 and can be provided to the active-noise-cancellation circuit 326. Different types of audioplethysmography 110 are further described with respect to FIGS. 4-1 and 4-2.

Audioplethysmography

Figures 1, 4:
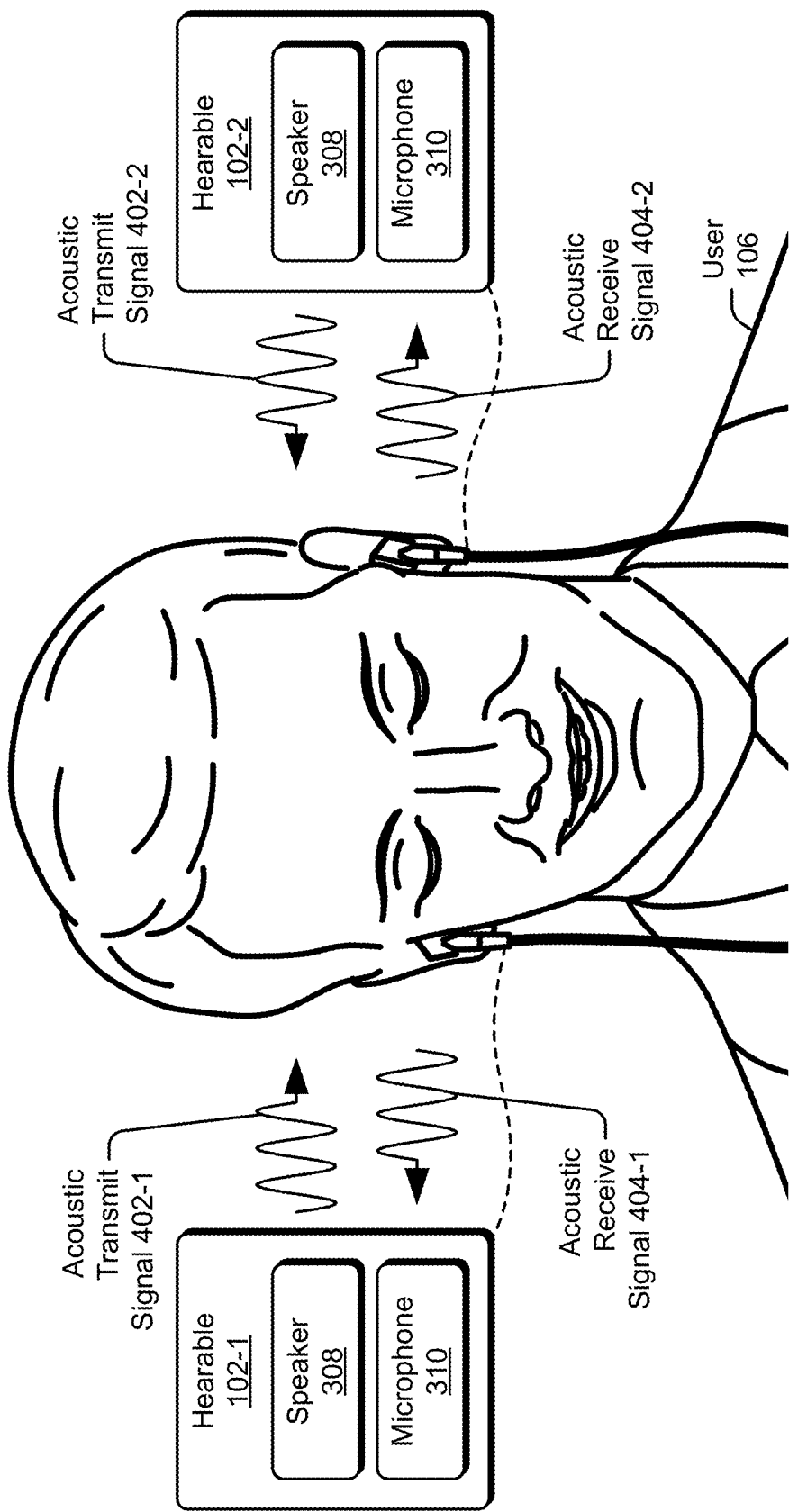
Figures 2, 4:
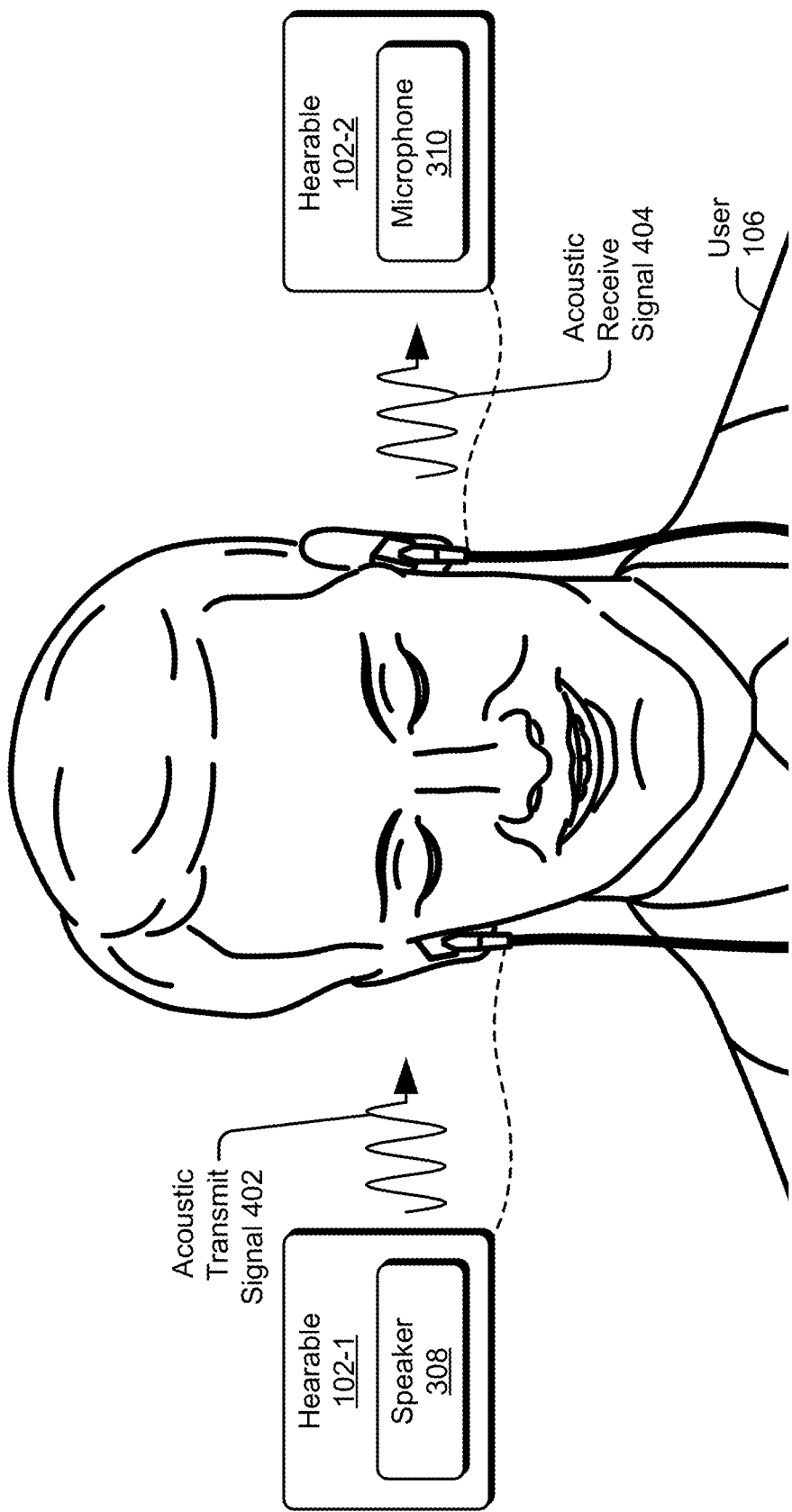

FIG. 4-1 illustrates example operations of two hearables 102-1 and 102-2 performing single-ear audioplethysmography 110. In environment 400-1, the hearables 102-1 and 102-2 independently perform audioplethysmography 110 on different ears 108 of the user 106. In this case, the first hearable 102-1 is proximate to the user 106's right ear 108, and the second hearable 102-2 is proximate to the user 106's left ear 108. Each hearable 102-1 and 102-2 includes a speaker 308 and a microphone 310. The hearables 102-1 and 102-2 can operate in a monostatic manner during the same time period or during different time periods. In other words, each hearable 102-1 and 102-2 can independently transmit and receive acoustic signals.

For example, the first hearable 102-1 uses the speaker 308 to transmit a first acoustic transmit signal 402-1, which propagates within at least a portion of the user 106's right ear canal 118. The first hearable 102-1 uses the microphone 310 to receive a first acoustic receive signal 404-1. The first acoustic receive signal 404-1 represents a version of the first acoustic transmit signal 402-1 that is modified, at least in part, by the acoustic circuit associated with the right ear canal 118. This modification can change an amplitude, phase, and/or frequency of the first acoustic receive signal 404-1 relative to the first acoustic transmit signal 402-1.

Similarly, the second hearable 102-2 uses the speaker 308 to transmit a second acoustic transmit signal 402-2, which propagates within at least a portion of the user 106's left ear canal 118. The second hearable 102-2 uses the microphone 310 to receive a second acoustic receive signal 404-2. The second acoustic receive signal 404-2 represents a version of the second acoustic transmit signal 402-2 that is modified by the acoustic circuit associated with the left ear canal 118. This modification can change an amplitude, phase, and/or frequency of the second acoustic receive signal 404-2 relative to the second acoustic transmit signal 402-2.

The techniques of single-ear audioplethysmography 110 can be particularly beneficial for biometric monitoring as it enables the smart device 104 to compile information from both hearables 102-1 and 102-2, which can further improve measurement confidence. For some aspects of audioplethysmography 110, it can be beneficial to analyze the acoustic channel between two ears 108, as further described with respect to FIG. 4-2.

FIG. 4-2 illustrates an example joint operation of two hearables 102-1 and 102-2 performing two-ear audioplethysmography 110. In the environment 400-2, the hearables 102-1 and 102-2 jointly perform audioplethysmography 110 across two ears 108 of the user 106. In this case, at least one of the hearables 102 (e.g., the first hearable 102-1) includes the speaker 308, and at least one of the other hearables 102 (e.g., the second hearable 102-2) includes the microphone 310. The hearables 102-1 and 102-2 operate together in a bistatic manner during the same time period.

During operation, the first hearable 102-1 transmits a first acoustic transmit signal 402 using the speaker 308. The acoustic transmit signal 402 propagates through the user 106's right ear canal 118. The acoustic transmit signal 402 also propagates through an acoustic channel that exists between the right and left ears 108. In the left ear 108, the acoustic transmit signal 402 propagates through the user 106's left ear canal 118 and is represented as an acoustic receive signal 404. The second hearable 102-2 receives the acoustic receive signal 404 using the microphone 310. The acoustic receive signal 404 represents a version of the acoustic transmit signal 402 that is modified by the acoustic circuit associated with the right ear canal 118, modified by the acoustic channel associated with the user 106's face, and modified by the acoustic circuit associated with the left ear canal 118. This modification can change an amplitude, phase, and/or frequency of the acoustic receive signal 404 relative to the acoustic transmit signal 402. In some cases, the hearable 102-2 measures the time-of-flight (ToF) associated with the propagation from the first hearable 102-1 to the second hearable 102-2. Sometimes a combination of single-ear and two-ear audioplethysmography 110 are applied to further improve measurement confidence.

The acoustic transmit signal 402 of FIGS. 4-1 and 4-2 can represent a variety of different types of signals. As described above with respect to FIG. 3, the acoustic transmit signal 402 can be an ultrasonic signal and/or an audible signal. Also, the acoustic transmit signal 402 can be a continuous-wave signal (e.g., a sinusoidal signal) or a pulsed signal. Some acoustic transmit signals 402 can have a particular tone (or frequency). Other acoustic transmit signals 402 can have multiple tones (or multiple frequencies). A variety of modulations can be applied to generate the acoustic transmit signal 402. Example modulations include linear frequency modulations, triangular frequency modulations, stepped frequency modulations, phase modulations, or amplitude modulations. The acoustic transmit signal 402 can be transmitted as part of a calibration procedure or a measurement procedure, as further described as part of FIG. 5.

Figure 5:
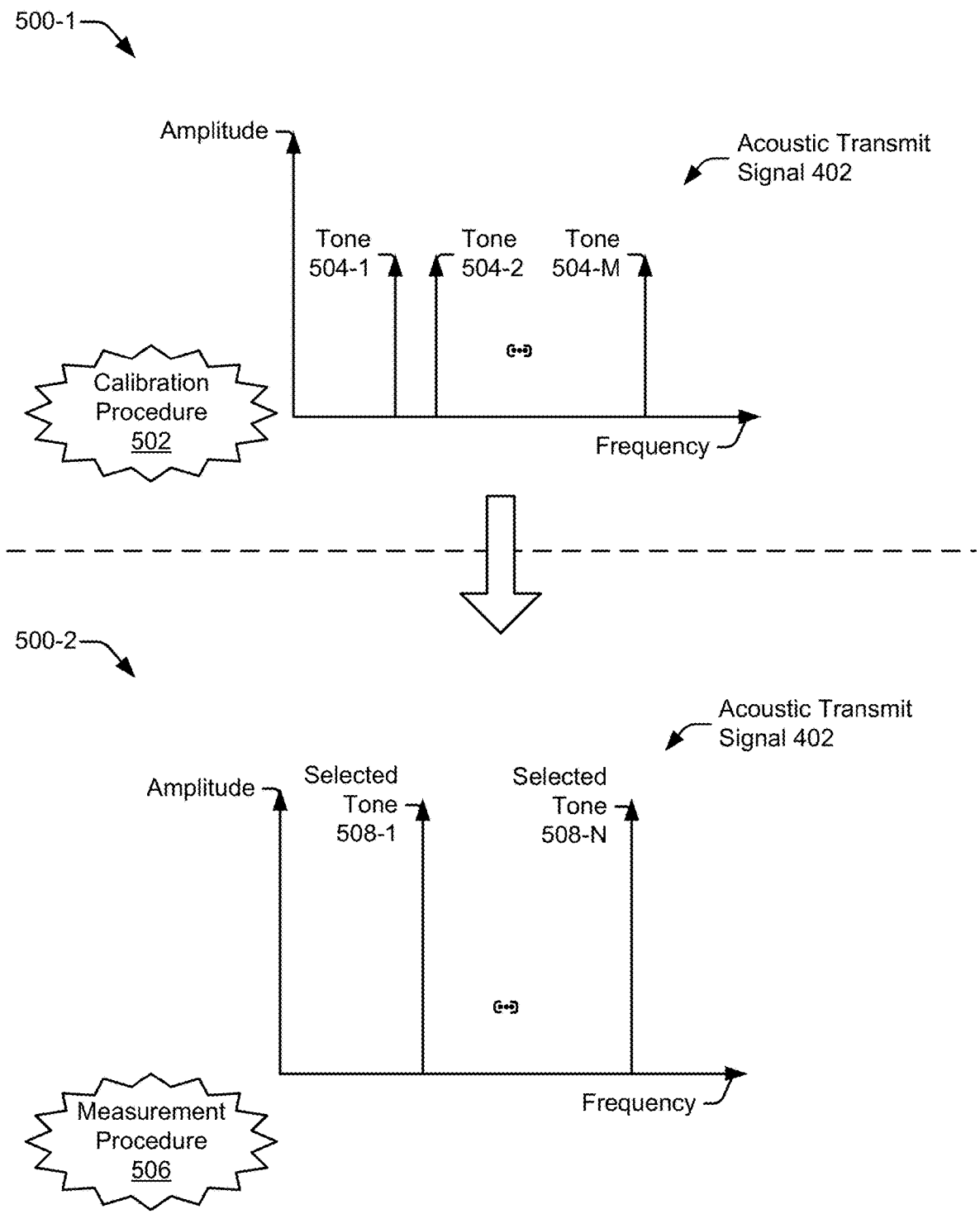
FIG. 5 illustrates an example operation of a hearable for detecting heart rate variability.

FIG. 5 illustrates an example operation of a hearable for detecting heart rate variability. At 500-1, the hearable 102 performs a calibration procedure 502. In some circumstances, the hearable 102 can perform on-head detection (or in-ear detection) by detecting the presence of the scal 116 and initiate the calibration procedure 502 based on a determination that on-head detection is "true." In other circumstances, the hearable 102 can initiate the calibration procedure 502 based on a specified schedule or a timer, which can be controlled by the user 106 via the smart device 104.

In accordance with the calibration procedure 502, the hearable 102 transmits an acoustic transmit signal 402 having multiple tones 504 (or multiple frequencies). The multiple tones 504 are transmitted simultaneously (e.g., in parallel) over a given time interval. The acoustic transmit signal 402 can have a particular bandwidth on the order of several kilohertz. For example, the acoustic transmit signal 402 can have a bandwidth of approximately 4, 5, 6, 8, 10, 16, or 20 KHz. In example implementations, the acoustic transmit signal 402 is transmitted over multiple seconds, such as 2, 3, 4, 6, or more seconds. A duration of each tone 504 can be evenly divided over a total duration of the acoustic transmit signal 402.

In this example, the acoustic transmit signal 402 is shown to include tones 504-1, 504-2 . . . 504-M, where M represents a positive integer. The variable M can be equal to 2, 3, 4, 5, 6 or more. In an example implementation, the acoustic transmit signal 402 has 6 tones 504 that are distributed between 30 and 35 kHz. In some cases, the tones 504 are evenly distributed across an interval. For example, the tones 504 can be in 1 kHz increments between 30 KHz and 35 KHz (e.g., at approximately 30, 31, 32, 33, 34, and 35 kHz). The term "approximately" means that the tones 504 can be within 5% of a given value or less (e.g., within 3%, 2%, or 1% of the given value).

An amplitude of the acoustic transmit signal 402 can be approximately the same across the tones 504-1 to 504-M. In this manner, power is evenly distributed across each tone 504. The quantity of tones (e.g., M) can be determined based on an output power of the speaker 308. Increasing the quantity of tones 504 can increase a likelihood that the hearable 102 can detect the cardiac activity across various conditions including user wear and a physical structure of the user's ear canal 118. However, an amplitude of the acoustic transmit signal 402 can be limited across these tones 504 based on the output power of the speaker 308.

Thus, the quantity of tones 504 can be optimized based on an amount of output power that is available for audioplethysmography 110.

The calibration procedure 502 selects one or more tones to be used for a measurement procedure 506, which are represented by selected tones 508-1 . . . 508-N, where N represents a positive integer that is less than M. In the case that M is equal to 6, the variable N can be equal to 1, 2, 3, 4, or 5. The selected tones 508-1 to 508-N represent a subset of the tones 504-1 to 504-M (e.g., a proper subset of the tones 504-1 to 504-M). In general, the calibration procedure 502 determines that the selected tones 508-1 to 508-N improve a signal-to-noise ratio for audioplethysmography 110.

At 500-2, the hearable 102 performs the measurement procedure 506 to detect the heart rate variability 112 and/or the blood pressure 114. In accordance with the measurement procedure 506, the hearable 102 transmits another acoustic transmit signal 402 having the selected tones 508-1 to 508-N. The selected tones 508-1 to 508-N are transmitted simultaneously (e.g., in parallel) over a given time interval, which may be similar or different than the time interval of the acoustic transmit signal 402 at 500-1.

An amplitude of the acoustic transmit signal 402 at 500-2 can be approximately the same across the selected tones 508-1 to 508-N. In this manner, power is evenly distributed across each selected tone 508. The amplitude of the acoustic transmit signal 402 at 500-2 can be higher than the amplitude of the acoustic transmit signal 402 at 500-1 because the available output power is distributed across fewer tones. Additionally or alternatively, a duration of each of the selected tones 508-1 to 508-N of the acoustic transmit signal 402 at 500-2 can be longer than the duration of the tones 504-1 to 504-N of the acoustic transmit signal 402 at 500-1. The higher amplitude and/or the longer duration can further improve the signal-to-noise ratio performance of the hearable 102 for audioplethysmography 110. By using a few selected tones 508-1 to 508-N that were determined to improve signal-to-noise ratio performance, the measurement procedure 506 can achieve a higher accuracy for measuring heart rate variability 112 and/or blood pressure 114. The audioplethysmography calibration module 320 is further described with respect to FIG. 6.

Figure 6:
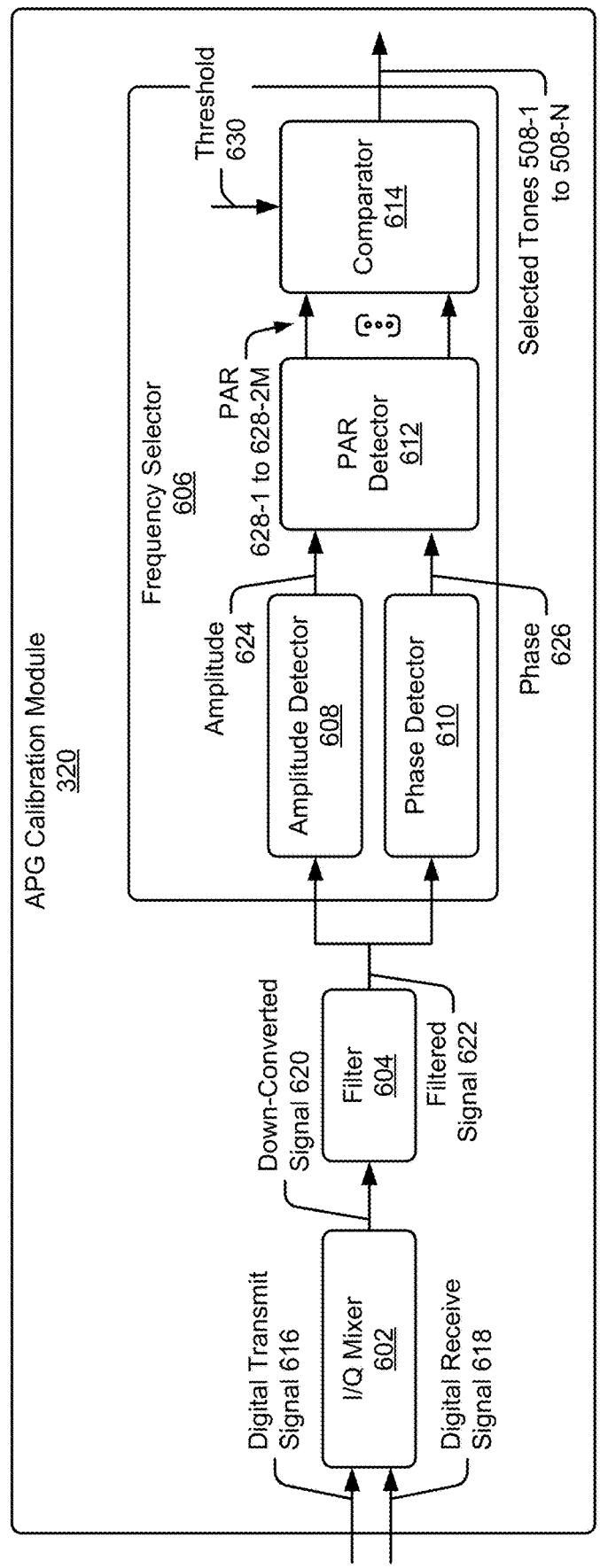
FIG. 6 illustrates an example scheme implemented by an audioplethysmography calibration module of a hearable.

FIG. 6 illustrates an example scheme implemented by the audioplethysmography calibration module 320. In the depicted configuration, the audioplethysmography calibration module 320 includes at least one in-phase and quadrature mixer 602 (I/Q mixer 602), at least one filter 604, and at least one frequency selector 606. The in-phase and quadrature mixer 602 performs frequency down-conversion and enables cardiac modulations that have amplitudes obscured by noise to be detected. In an example implementation, the in-phase and quadrature mixer 602 includes at least two mixers, at least one phase shifter, and at least one combiner (e.g., a summation circuit). The filter 604 attenuates intermodulation products that are generated by the in-phase and quadrature mixer 602. In an example implementation, the filter 604 is implemented using a low-pass filter.

The frequency selector 606 selects one or more tones for audioplethysmography 110 (e.g., determines the selected tones 508-1 to 508-N). In an example implementation, the frequency selector 606 includes at least one amplitude detector 608 (e.g., an envelope detector), at least one phase detector 610, at least one peak-to-average ratio (PAR) detector 612 (PAR detector 612), and at least one comparator 614. The operation of these components are further described below.

During the calibration procedure 502, the hearable 102 transmits the acoustic transmit signal 402, as shown at 500-1 in FIG. 5, and receives the acoustic receive signal 404. The audioplethysmography calibration module 320 accepts the digital transmit signal 616, which represents a version of the acoustic transmit signal 402. Also, the audioplethysmography calibration module 320 accepts the digital receive signal 618, which represents a digital version of the acoustic receive signal 404.

The in-phase and quadrature mixer 602 uses the phase shifter and the two mixers to generate in-phase and quadrature components associated with the digital receive signal 618. In particular, the in-phase and quadrature mixer 602 mixes the digital receive signal 618 with a first version of the digital transmit signal 616 that has a zero-degree phase shift to generate the in-phase component. Additionally, the in-phase and quadrature mixer 602 mixes the digital receive signal 618 with a second version of the digital transmit signal 616 that has a 180-degree phase shift to generate the quadrature signal. This mixing operation downconverts the digital receive signal 618 from acoustic frequencies to baseband frequencies. Using the combiner, the in-phase and quadrature mixer 602 combines the in-phase and quadrature components of the digital receive signal 618 to generate a down-converted signal 620. Use of the in-phase and quadrature mixer 602 can further improve the signal-to-noise ratio of the down-converted signal 620 compared to other mixing techniques.

In this example, the down-converted signal 620 represents a combination of the in-phase and quadrature components of the mixed-down digital receive signal 618. In alternative implementations, the in-phase and quadrature mixer 602 doesn't include the combiner and passes the in-phase and quadrature components separately to the filter 604. In this manner, the in-phase and quadrature components individually propagate through the filter 604.

The filter 604 generates a filtered signal 622 based on the down-converted signal 620. In particular, the filter 604 filters the down-converted signal 620 to attenuate spurious or undesired frequencies (e.g., intermodulation products), some of which can be associated with an operation of the in-phase and quadrature mixer 602. In this example, the filtered signal 622 represents a combination of the in-phase and quadrature components of the down-converted signal 620. Alternatively, the filtered signal 622 can represent separate or distinct in-phase and quadrature components, which are individually passed to the frequency selector 606.

In this example, the frequency selector 606 extracts an amplitude 624 of the filtered signal 622 using the amplitude detector 608 and extracts a phase 626 of the filtered signal 622 using the phase detector 610. Alternatively, if the in-phase and quadrature components of the filtered signal 622 are received separately, the amplitude detector 608 and the phase detector 610 can respectively measure the amplitude 624 and phase 626 based on the in-phase and quadrature components.

The peak-to-average ratio detector 612 measures peak-to-average ratios 628-1 to 628-2M for each of the tones 504-1 to 504-M and for each of the characteristics (e.g., amplitude 624 and phase 626). In general, the peak-to-average ratio 628 represents a peak intensity within a frequency range associated with a heart beat divided by an average intensity within this frequency range. The frequency range can be, for example, between 0.58 and 3.3 Hz to correspond with a possible range of a human heart rate, which can be between 35 and 200 beats-per-minute. A higher peak-to-average ratio 628 indicates a better cardiac modulation quality, or more generally, a higher signal-to-noise ratio.

In one aspect, the comparator 614 can evaluate the peak-to-average ratios 628-1 to 628-M with respect to a threshold 630. The threshold 630 can be set, for example, to a particular value, such as 4. In other cases, the audioplethysmography calibration module 320 can dynamically determine the threshold 630 and update it over time based on the observed peak-to-average ratios 628-1 to 628-2M. In an example implementation, the comparator 614 determines the selected tones 508-1 to 508-N based on the frequencies associated with the peak-to-average ratios 628-1 to 628-M that are greater than or equal to the threshold 630.

Additionally or alternatively, the comparator 614 can evaluate the peak-to-average ratios 628-1 to 628-M with respect to each other. In an example implementation, the comparator 614 determines one of the selected tones 508 based on a frequency with the highest peak-to-average ratio 628 across the amplitude 624. Also, the comparator 614 can determine one of the selected tones 508 based on a frequency with the highest peak-to-average ratio 628 across the phase 626. In other implementations, the comparator 614 can determine a single selected tone 508 based on a frequency having the highest peak-to-average ratio 628-1 to 628-2M associated with either the amplitude 624 or the phase 626.

In general, the audioplethysmography calibration module 320 enables the selected tones 508-1 to 508-N to be dynamically adjusted prior to the measurement procedure 506 based on a current environment, which can account for a wear of the hearable 102 (e.g., a current insertion depth and/or rotation), a physical structure of the user 106's ear canal 118, and a response characteristic of the hearable 102 (e.g., speaker, microphone, and/or housing). In this manner, the audioplethysmography calibration module 320 can improve signal-to-noise ratio performance of the hearable 102 for the measurement procedure 506. The audioplethysmography calibration module 320 can also determine which tones 504 generate acoustic receive signals 404 with detectable cardiac modulations in amplitude 624 and/or phase 626. Example amplitudes 624, phases 626, and peak-to-average ratios 628 are further described with respect to FIG. 7.

Figure 7:
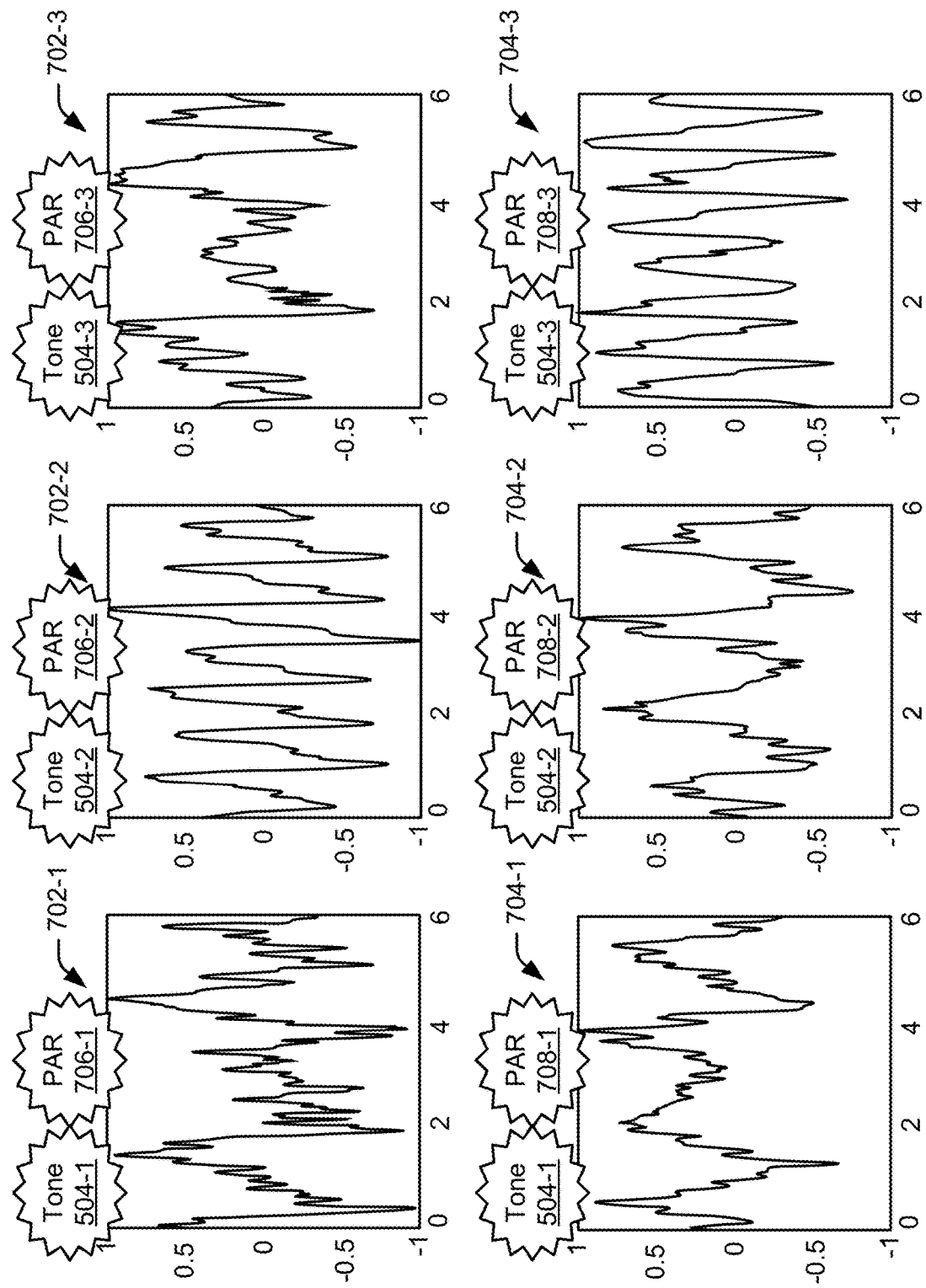
FIG. 7 illustrates example amplitudes and phases of a filtered signal at different frequencies for detecting heart rate variability using a hearable.

FIG. 7 illustrates example amplitudes 624 and phases 626 of the filtered signal 622 across tones 504-1, 504-2, and 504-3. At the top of FIG. 7, graphs 702-1, 702-2, and 702-3 depict an amplitude 624 of the filtered signal 622 across the respective tones 504-1 to 504-3. The horizontal dimension of the graphs 702-1 to 702-3 represent time in seconds, and the vertical dimension of the graphs 702-1 to 702-3 represent a normalized amplitude. The amplitude 624 of the filtered signal 622 has peak-to-average ratios 706-1 to 706-3 respectively associated with the tones 504-1 to 504-3. The peak-to-average ratios 706-1 to 706-3 represent a portion of the peak-to-average ratios 628-1 to 628-2M.

In this example, the peak-to-average ratio 706-2 is higher than the peak-to-average ratio 706-3, which is higher than the peak-to-average ratio 706-1. In other words, the tone 504-2 has the highest peak-to-average ratio 706-2 across the amplitude 624. Also, the peak-to-average ratio 706-2 is greater than the threshold 630 while the peak-to-average ratios 706-1 and 706-3 are less than the threshold 630.

At the bottom of FIG. 7, graphs 704-1, 704-2, and 704-3 depict a phase 626 of the filtered signal 622 across the respective tones 504-1 to 504-3. The horizontal dimension of the graphs 704-1 to 704-3 represent time in seconds, and the vertical dimension of the graphs 704-1 to 704-3 represent a normalized phase. The phase 626 of the filtered signal 622 has peak-to-average ratios 708-1 to 708-3 respectively associated with the tones 504-1 to 504-3. The peak-to-average ratios 708-1 to 708-3 represent a portion of the peak-to-average ratios 628-1 to 628-2M.

In this example, the peak-to-average ratio 708-3 is higher than the peak-to-average ratio 708-1, which is higher than the peak-to-average ratio 708-2. In other words, the tone 504-3 has the highest peak-to-average ratio 708-3 across the phase 626. Also, the peak-to-average ratio 706-3 is greater than the threshold 630 while the peak-to-average ratios 706-1 and 706-2 are less than the threshold 630.

As shown in FIG. 7, cardiac activity (e.g., a heartbeat) of the user 106 may or may not be detectable within the amplitude 624 or phase 626. For the tone 504-1, the cardiac activity does not significantly modulate the amplitude 624 or phase 626, which is represented by the relatively low peak-to-average ratios 706-1 and 708-1. For the tone 504-2, the cardiac activity does significantly modulate the amplitude 624 but not the phase 626. For the tone 704-3, the cardiac activity does not significantly modulate the amplitude 624 but does significantly modulate the phase 626.

With these peak-to-average ratios 706-1 to 706-3 and 708-1 to 708-3, the frequency selector 606 can select at least the tone 504-2 based on the peak-to-average ratio 706-2 and/or the tone 504-3 based on the peak-to-average ratio 706-3 for the measurement procedure 506. In some cases, the frequency selector 606 selects only the tone 504-2, only the tone 504-3, or both the tones 504-2 and 504-3. In situations in which other tones 504 (not shown) have peak-to-average ratios 628 that are greater than the threshold 630, these tones 504 may also be optionally selected by the frequency selector 606.

Figure 8:
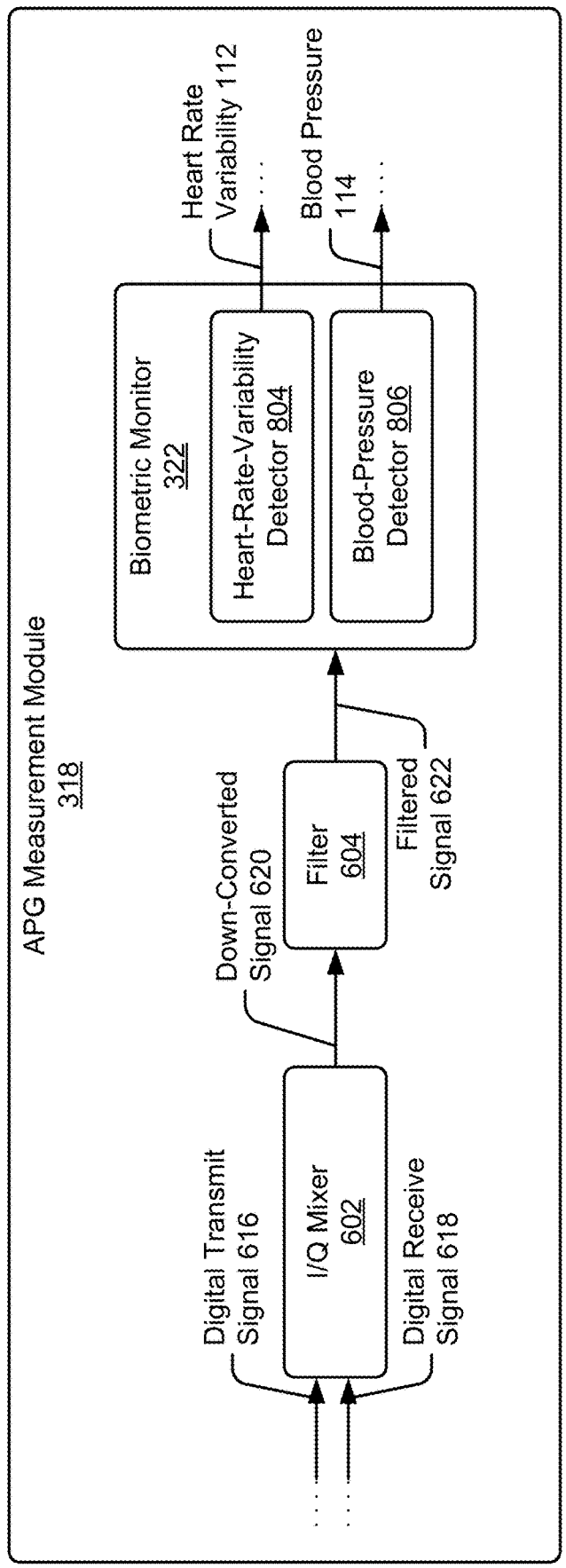
FIG. 8 illustrates an example scheme implemented by an audioplethysmography measurement module of a hearable.

FIG. 8 illustrates an example scheme implemented by the audioplethysmography measurement module 318. In the depicted configuration, the audioplethysmography measurement module 318 includes at least one in-phase and quadrature mixer 602, at least one filter 604, and at least one biometric monitor 322. The in-phase and quadrature mixer 602 and the filter 604 of the audioplethysmography measurement module 318 can be similar to the in-phase and quadrature mixer 602 and the filter 604 of the audioplethysmography calibration module 320.

The biometric monitor 322 determines one or more physiological metrics of the user 106 for monitoring heart rate variability 112 and/or blood pressure 114. In this example, the biometric monitor 322 includes a heart-rate-variability detector 804 and/or a blood-pressure detector 806. The heart-rate-variability detector 804 measures the heart rate variability 112 of the user 106. The blood pressure detector 806 measures the blood pressure 114 of the user 106. The biometric monitor 322 can pass the measured heart rate variability 112 and/or the measured blood pressure 114 to the audioplethysmography-based application 206 for further processing or for displaying to the user 106.

During the measurement procedure 506, the hearable 102 transmits the audio transmit signal 402, as shown at 500-2 in FIG. 5, and receives the acoustic receive signal 404. The audioplethysmography measurement module 318 accepts the digital transmit signal 616, which represents a version of the acoustic transmit signal 402. Also, the audioplethysmography measurement module 318 accepts the digital receive signal 618, which represents a digital version of the acoustic receive signal 404.

The audioplethysmography measurement module 318 performs similar operations as the audioplethysmography calibration module 320 to generate the filtered signal 622. The heart-rate-variability detector 804 uses peak finding estimation to localize the peak of each heartbeat within the filtered signal 622. This estimation can be performed across the amplitude and/or phase of the filtered signal 622. Example peak finding estimation techniques include Z-score, local maxima, and divide and conquer. The heart-rate-variability detector 804 can measure the heart rate variability 112 by calculating a root mean square of successive differences (RMSSD) between each peak (e.g., between each heartbeat).

The blood-pressure detector 806 can detect occurrences of a dicrotic notch within the filtered signal 622. The blood-pressure detector 806 can determine the blood pressure 114 of the user based on the occurrences of the dicrotic notch.

In FIGS. 5, 6, and 8, the calibration procedure 502 and the measurement procedure 506 are described as individual procedures that occur at different time intervals. In particular, the calibration procedure 502 occurs before the measurement procedure 506. This enable the acoustic transmit signal 402 for the measurement procedure 506 to be transmitted with fewer tones than the acoustic transmit signal 402 for the calibration procedure 502, which can further enable cardiac activity to be detected in the presence of noise by increasing the signal-to-noise ratio. In some implementations, however, the hearable 102 can have sufficient output power to perform the measurement procedure 506 with the multiple tones 504-1 to 504-M using a single acoustic transmit signal 402. In this case, aspects of the frequency selector 606 are integrated within the audioplethysmography measurement module 318 and effectively pass selected tones 508-1 to 508-N of the filtered signal 622 to the biometric monitor 322.

Figure 9:
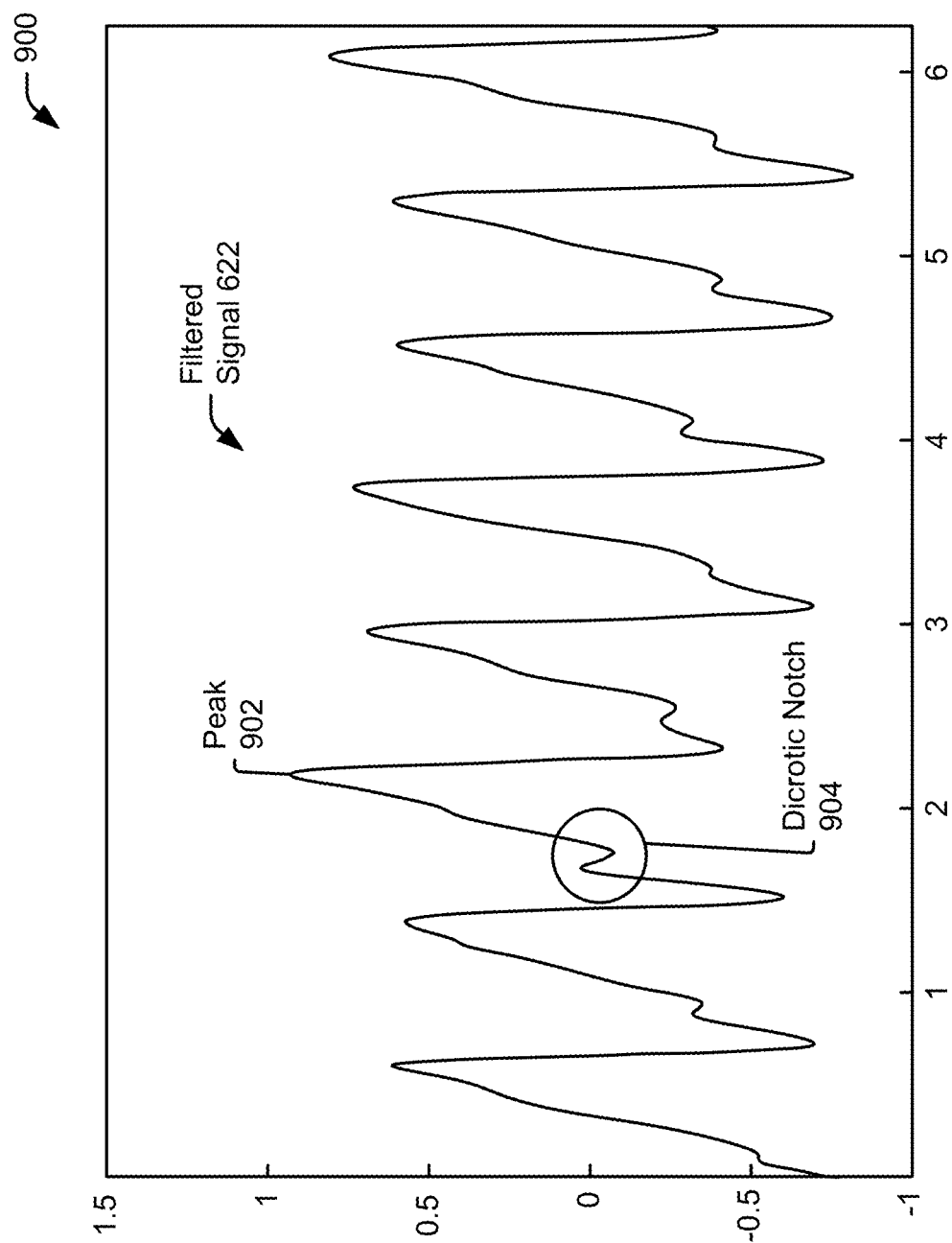
FIG. 9 illustrates an example amplitude of a filtered signal for detecting heart rate variability or blood pressure using a hearable.

FIG. 9 illustrates an example graph 900 of an amplitude 624 of the filtered signal 622 for detecting heart rate variability 112 or blood pressure 114 using the hearable 102. A horizontal dimension of the graph 900 represents time in seconds, and a vertical dimension of the graph 900 represents a normalized amplitude. The filtered signal 622 has peaks 902, which are identified using triangles. The filtered signal 622 also has dicrotic notches 904, an example of which is circled in FIG. 9. Each peak 902 is associated with a heartbeat of the user, and can be identified by the heart-rate-variability detector 804 to measure the heart rate variability 112. Each dicrotic notch 904 can be identified by the blood-pressure detector 806 to measure the blood pressure 114.

Example Methods

Figure 10:
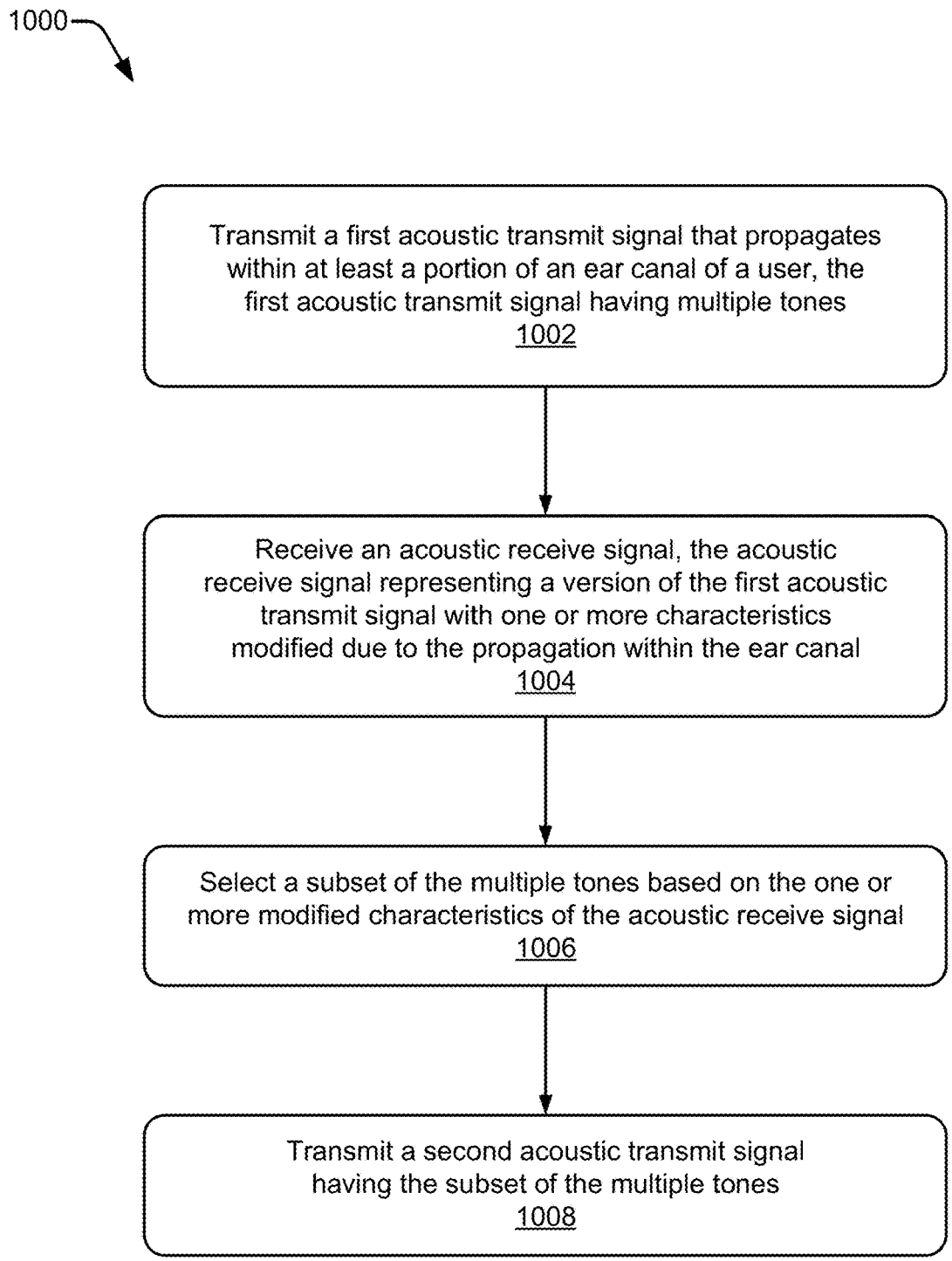
FIG. 10 illustrates an example method for performing an aspect of detecting heart rate variability using a hearable.
Figure 11:
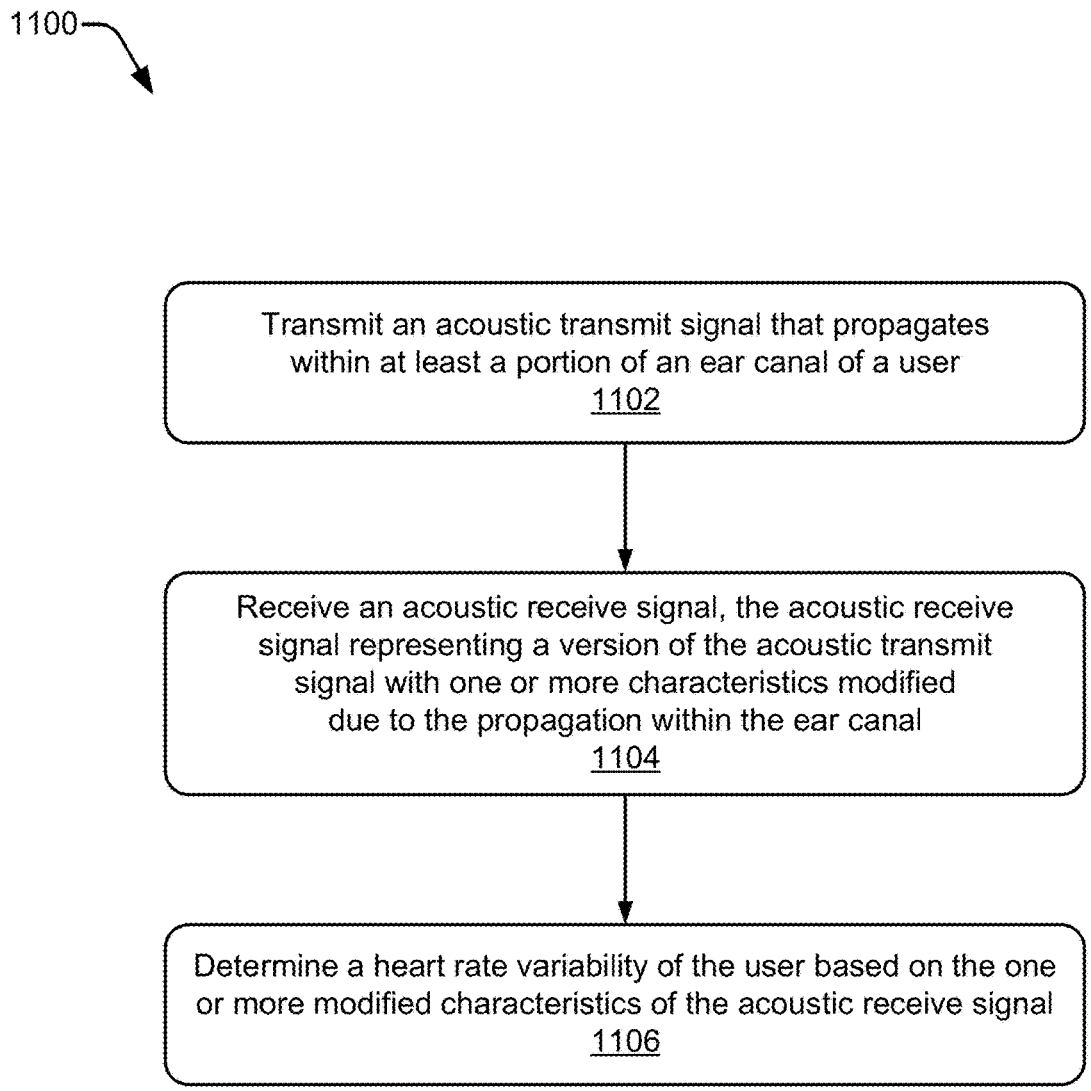
FIG. 11 illustrates another example method for performing an aspect of detecting heart rate variability using a hearable.

FIGS. 10 and 11 depict example methods 1000 and 1100 for implementing aspects of heart rate variability detection using a hearable. Methods 1000 and 1100 are shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100 of FIG. 1, and entities detailed in FIGS. 2 and 3, reference to which is made for example only. The techniques are not limited to performance by one entity or multiple entities operating on one device.

At 1002 in FIG. 10, a first acoustic transmit signal that propagates within at least a portion of an ear canal of a user is transmitted. The first acoustic transmit signal has multiple tones. For example, as part of a calibration procedure 502, the hearable 102 transmits the acoustic transmit signal 402 shown at 500-1 in FIG. 5. The acoustic transmit signal 402 propagates within at least a portion of the ear canal 118 of the user 106, as described with respect to FIGS. 4-1 and 4-2. The acoustic transmit signal 402 has multiple tones, such as tones 504-1 to 504-M shown in FIG. 5. The calibration procedure 502 can be initiated based on the hearable 102 determining that on-head detection is "true."

At 1004, an acoustic receive signal is received. The acoustic receive signal represents a version of the first acoustic transmit signal with one or more characteristics modified due to the propagation within the car canal. For example, as part of the calibration procedure 502, the hearable 102 receives the acoustic receive signal 404 shown in FIGS. 4-1 and 4-2. The acoustic receive signal 404 represents a version of the acoustic transmit signal 402 with one or more characteristics (e.g., signal characteristics or waveform characteristics) modified due to the propagation within the car canal 118. Example characteristics can include amplitude 624 and/or phase 626.

At 1006, a subset of the multiple tones is selected based on the one or more modified characteristics of the acoustic receive signal. For example, the audioplethysmography calibration module 320 selects the tones 508-1 to 508-N, which represent a subset (e.g., a proper subset) of the multiple tones 504-1 to 504-M. In some implementations, there are fewer selected tones 508 compared to the tones 504 (e.g., N is less than M). The selected tones 508 can have better signal-to-noise ratio performance relative to the non-selected tones based on current environmental conditions (e.g., the wear of the hearable 102 and/or the physical structure of the user 106's ear canal 118).

At 1008, a second acoustic transmit signal having the subset of the multiple tones is transmitted. For example, as part of a measurement procedure 506, the hearable 102 transmits the acoustic transmit signal 402 shown at 500-2 in FIG. 5. This acoustic transmit signal 402 can have a higher amplitude and/or a longer duration at each of the selected tones 508-1 to 508-N compared to the previous acoustic transmit signal 402 associated with the calibration procedure 502. By receiving a reflection of the second acoustic transmit signal 402, the hearable 102 can detect the heart rate variability 112 and/or the blood pressure 114 of the user 106, as further described with respect to FIG. 11.

At 1102 of FIG. 11, an acoustic transmit signal that propagates within at least a portion of an ear canal of a user is transmitted. For example, the transducer 306 (or speaker 308) of the hearable 102 transmits the acoustic transmit signal 402. The acoustic transmit signal 402 propagates within at least a portion of the car canal 118 of the user 106, as described with respect to FIGS. 4-1 and 4-2. The acoustic transmit signal 402 can have one or more tones 508 (e.g., frequencies), which may have been determined by a calibration process 502 to improve signal-to-noise ratio performance based on current environmental conditions. Example tones can include those within the audible range (e.g., between 20 Hz and 20 kHz) and/or those within the ultrasonic range (e.g., between 20 kHz and 2 MHZ). The acoustic transmit signal 402 can be a sinusoidal signal or a pulsed signal.

At 1104, an acoustic receive signal is received. The acoustic receive signal represents a version of the acoustic transmit signal with one or more characteristics modified due to the propagation within the car canal. For example, the transducer 306 (or the microphone 310) of the hearable 102 receives the acoustic receive signal 404. The acoustic receive signal 404 represents a version of the acoustic transmit signal 402 with one or more characteristics modified due to the propagation within the ear canal 118. The characteristics can also be modified, at least in part, by the user 106's biometrics. Example characteristics include amplitude 624 and/or phase 626. In some implementations, a feedback microphone of an active-noise-cancellation circuit 326 can receive the acoustic receive signal 404.

At 1106, a heart rate variability of the user is determined based on the one or more modified characteristics of the acoustic receive signal. For example, the hearable 102 determines (e.g., measures) the heart rate variability 112 of the user 106 using the audioplethysmography measurement module 318. In particular, the hearable 102 can use peak finding estimation to localize peaks associated with each heartbeat and calculate a root mean square of successive differences across these peaks to measure the heart rate variability 112. Additionally or alternatively, the hearable 102 can determine the blood pressure 114 of the user 106 using the audioplethysmography measurement module 318.

In some situations, the methods 1000 and/or 1100 are performed using one hearable 102 for single-ear audioplethysmography 110, as described with respect to FIG. 4-1. In other situations, the methods 1000 and/or 1100 are performed using two hearables 102 for two-ear audioplethysmography 110, as described with respect to FIG. 4-2.

Example Computing System

Figure 12:
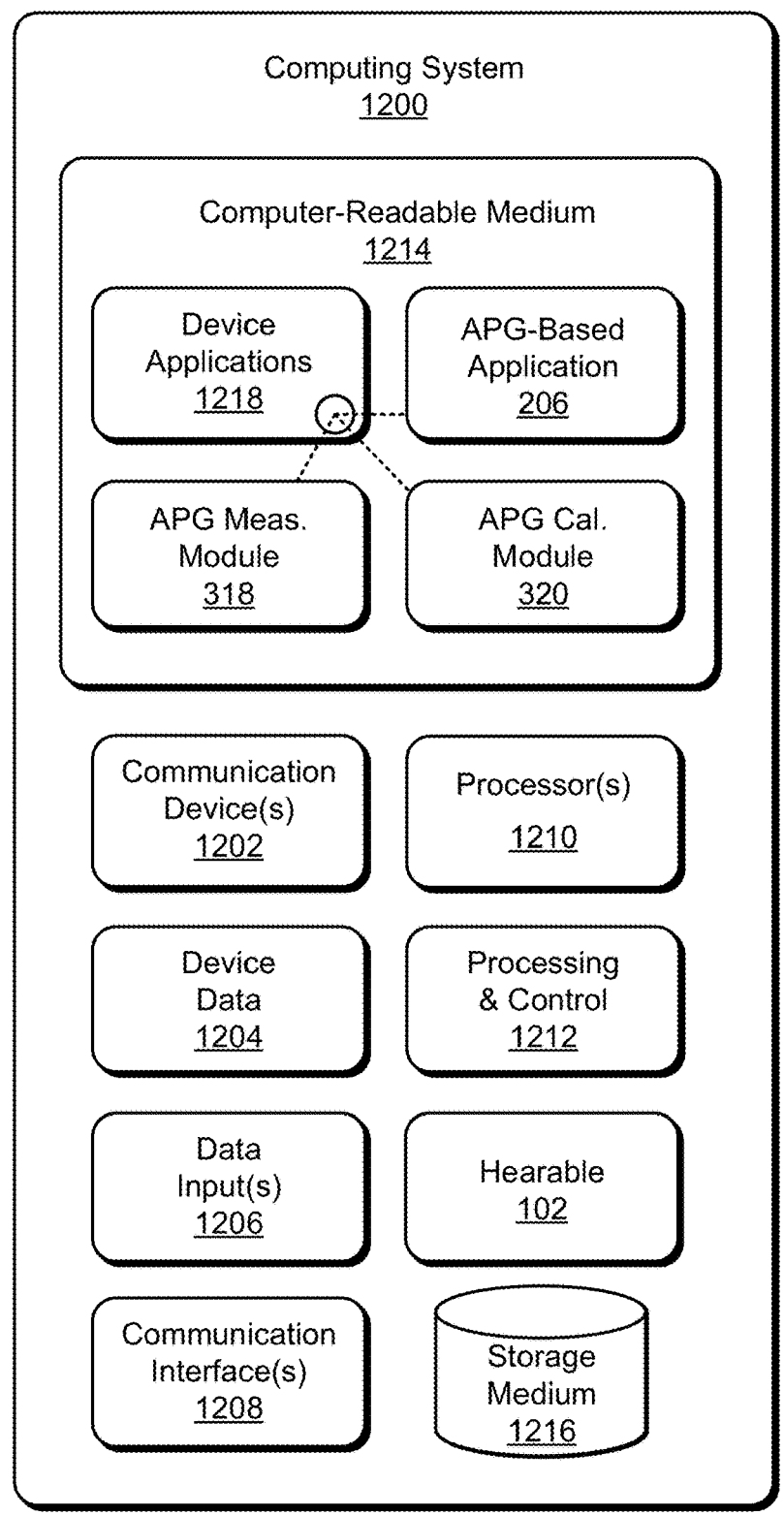
FIG. 12 illustrates an example computing system embodying, or in which techniques may be implemented that enable use of, heart rate variability detection using a hearable.

FIG. 12 illustrates various components of an example computing system 1200 that can be implemented as any type of client, server, and/or computing device as described with reference to the previous FIGS. 2 and 3 to implement aspects of active acoustic sensing using a hearable.

The computing system 1200 includes communication devices 1202 that enable wired and/or wireless communication of device data 1204 (e.g., received data, data that is being received, data scheduled for broadcast, or data packets of the data). The communication devices 1202 or the computing system 1200 can include one or more hearables 102. The device data 1204 or other device content can include configuration settings of the device, media content stored on the device, and/or information associated with a user of the device. Media content stored on the computing system 1200 can include any type of audio, video, and/or image data. The computing system 1200 includes one or more data inputs 1206 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1200 also includes communication interfaces 1208, which can be implemented as any one or more of a serial and/or parallel interface, a wireless interface, any type of network interface, a modem, and as any other type of communication interface. The communication interfaces 1208 provide a connection and/or communication links between the computing system 1200 and a communication network by which other electronic, computing, and communication devices communicate data with the computing system 1200.

The computing system 1200 includes one or more processors 1210 (e.g., any of microprocessors, controllers, and the like), which process various computer-executable instructions to control the operation of the computing system 1200. Alternatively or in addition, the computing system 1200 can be implemented with any one or combination of hardware, firmware, or fixed logic circuitry that is implemented in connection with processing and control circuits which are generally identified at 1212. Although not shown, the computing system 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1200 also includes a computer-readable medium 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1200 can also include a mass storage medium device (storage medium) 1216.

The computer-readable medium 1214 provides data storage mechanisms to store the device data 1204, as well as various device applications 1218 and any other types of information and/or data related to operational aspects of the computing system 1200. For example, an operating system 1220 can be maintained as a computer application with the computer-readable medium 1214 and executed on the processors 1210. The device applications 1218 may include a device manager, such as any form of a control application, software application, signal-processing and control module, code that is native to a particular device, a hardware abstraction layer for a particular device, and so on.

The device applications 1218 also include any system components, engines, or managers to implement audioplethysmography 110 for detecting heart rate variability 112 and/or blood pressure 114. In this example, the device applications 1218 include the audioplethysmography-based application 206 (APG-based application 206) of FIG. 2, the audioplethysmography measurement module 318 of FIG. 3, and optionally the audioplethysmography calibration module 320 of FIG. 3.

Conclusion

Although techniques using, and apparatuses including, facilitating heart rate variability detection using a hearable have been described in language specific to features and/or methods, it is to be understood that the subject of the appended claims is not necessarily limited to the specific features or methods described. Rather, the specific features and methods are disclosed as example implementations of facilitating heart rate variability detection using a hearable. Some examples are provided below.

Example 1: A method comprising:
transmitting an acoustic transmit signal that propagates within at least a portion of an ear canal of a user;
receiving an acoustic receive signal, the acoustic receive signal representing a version of the acoustic transmit signal with one or more characteristics modified due to the propagation within the ear canal; and determining a heart rate variability of the user based on the one or more modified characteristics of the acoustic receive signal.

Example 2: The method of example 1, wherein the transmitting of the acoustic transmit signal comprising transmitting the acoustic transmit signal with at least two tones.

Example 3: The method of example 2, further comprising:
transmitting, prior to the transmitting of the acoustic transmit signal, another acoustic transmit signal that propagates within at least the portion of the ear canal of the user, the other acoustic transmit signal having multiple tones, the multiple tones including the at least two tones and at least one other tone;
receiving, prior to the transmitting of the acoustic transmit signal, another acoustic receive signal, the other acoustic receive signal representing a version of the other acoustic transmit signal with one or more characteristics modified due to the propagation within the ear canal; and
selecting the at least two tones from the multiple tones based on the acoustic receive signal.

Example 4: The method of example 3, wherein transmitting the acoustic transmit signal comprises transmitting the acoustic transmit signal such that the acoustic transmit signal has a higher amplitude at the at least two tones compared to an amplitude of the other acoustic transmit signal at the multiple tones.

Example 5: The method of example 3, wherein transmitting the acoustic transmit signal comprises transmitting the acoustic transmit signal such that a duration of acoustic transmit signal at each of the at least two tones is longer compared to a duration of the other acoustic transmit signal at each of the multiple tones.

Example 6: The method of any previous example, wherein the determining the heart rate variability of the user comprises:
generating a down-converted signal based on the acoustic receive signal by mixing a digital version of the acoustic receive signal with a digital version of the acoustic transmit signal using an in-phase and quadrature mixer;
generating a filtered signal based on the down-converted signal by passing the down-converted signal through a low-pass filter; and
measuring the heart rate variability based on peaks within an amplitude and/or a phase of the filtered signal.

Example 7: The method of any previous example, further comprising:
determining a blood pressure of the user based on the one or more modified characteristics of the acoustic receive signal.

Example 8: The method of example 7, wherein the determining the blood pressure of the user comprises:
detecting occurrences of a dicrotic notch within an amplitude and/or a phase of a version of the acoustic receive signal; and
measuring the blood pressure of the user based on the occurrences of the dicrotic notch.

Example 9: The method of any previous example, wherein the acoustic transmit signal comprises an ultrasound signal having frequencies between approximately twenty kilohertz and two megahertz.

Example 10: The method of any previous example, further comprising:
transmitting audible content during at least a portion of time that the acoustic transmit signal is transmitted.

Example 11: The method of any previous example, further comprising:

a hearable forming at least a partial acoustic seal in or around a user's outer ear, the seal enabling formation of an acoustic circuit, which includes the seal, the hearable, the ear canal, and an ear drum of the ear, the hearable being configured to emit the acoustic transmit signal and/or to receive the acoustic receive signal.

Example 12: The method of any previous example, further comprising at least one transducer for converting sound waves into an electrical signal and/or for converting an electrical signal into a sound waves, the at least one transducer in particular being part of the hearable or connected to the hearable.

Example 13: The method of any previous example, wherein the acoustic transmit signal is represented by a sine function or is a pulsed signal and is modified in at least one quantity, in particular the amplitude, the phase and/or the frequency, representing the acoustic receive signal.

Example 14: The method of any previous example, wherein a transducer for acoustic sound is operable in a monostatic or bistatic topology.

Example 15: The method of any previous example, wherein before the transmitting of the acoustic transmit signal, a calibration procedure is performed, involving the selection of as subset of tones from multiple of tones.

Example 16: A method comprising:
transmitting a first acoustic transmit signal that propagates within at least a portion of an ear canal of a user, the first acoustic transmit signal having multiple tones;
receiving an acoustic receive signal, the acoustic receive signal representing a version of the first acoustic transmit signal with one or more characteristics modified due to the propagation within the ear canal;
selecting a subset of the multiple tones based on the one or more modified characteristics of the acoustic receive signal; and
transmitting a second acoustic transmit signal having the subset of the multiple tones.

Example 17: The method of example 16, wherein a quantity of the subset of the multiple tones is less than a quantity of the multiple tones.

Example 18: The method of example 16 or 17, wherein the transmitting of the second acoustic transmit signal comprises transmitting the second acoustic transmit signal having a higher amplitude at each tone within the subset of the multiple tones compared to an amplitude of the other acoustic transmit signal at each of the multiple tones.

Example 19: The method of any one of examples 16 to 18, wherein the transmitting of the second acoustic transmit signal comprises transmitting the second acoustic transmit signal having a longer duration at each tone within the subset of the multiple tones compared to a duration of the other acoustic transmit signal at each of the multiple tones.

Example 20: The method of any one of examples 16 to 19, wherein the selecting the subset of the multiple tones comprises:
determining at least one tone of the multiple tones is associated with an amplitude of the acoustic receive signal having a peak-to-average ratio that is above a threshold; and
determining at least one other tone of the multiple tones is associated with a phase of the acoustic receive signal having another peak-to-average ratio that is above the threshold.

Example 21: A device comprising:
at least one transducer; and at least one processor, the device configured to perform, using the at least one transducer and the at least one processor, any one of the methods of examples 1-20.

Example 22: The device of example 21, further comprising:
a speaker; and
an active-noise-cancellation circuit comprising a feedback microphone,
wherein the at least one transducer comprises the speaker and the feedback microphone.

Example 23: The device of example 21, wherein:
the at least one transducer comprises a speaker and a microphone;
the speaker is configured to be positioned proximate to a first ear of a user; and
the microphone is configured to be positioned proximate to a second ear of the user.

Example 24: The device of example 21, further comprising:
two hearables positioned proximate to different ears of a user, the two hearables each comprising the at least one transducer and the at least one processor,
wherein the two hearables are configured to transmit acoustic signals having different sets of tones.

Example 25: The device of any one of examples 21 to 24, wherein the device comprises at least one earbud.

What is claimed is:

1. A method comprising:
transmitting a first acoustic transmit signal that propagates within at least a portion of an ear canal of a person, the first acoustic transmit signal having multiple frequencies;
receiving an acoustic receive signal, the acoustic receive signal representing a version of the first acoustic transmit signal with one or more characteristics modified due to the propagation within the ear canal;
selecting a subset of the multiple frequencies based on the one or more modified characteristics of the acoustic receive signal; and
transmitting a second acoustic transmit signal that propagates within at least the portion of the ear canal of the person, the second acoustic transmit signal having the subset of the multiple frequencies.

2. The method of claim 1, wherein a quantity of the subset of the multiple frequencies is less than a quantity of the multiple frequencies.

3. The method of claim 1, wherein the transmitting of the second acoustic transmit signal comprises transmitting the second acoustic transmit signal having a higher amplitude at each frequency within the subset of the multiple frequencies compared to an amplitude of the first acoustic transmit signal at each of the multiple frequencies.

4. The method of claim 1, wherein the transmitting of the second acoustic transmit signal comprises transmitting the second acoustic transmit signal having a longer duration at each frequency within the subset of the multiple frequencies compared to a duration of the first acoustic transmit signal at each of the multiple frequencies.

5. The method of claim 1, wherein the selecting the subset of the multiple frequencies comprises:
determining at least one frequency of the multiple frequencies is associated with an amplitude of the acoustic receive signal having a peak-to-average ratio that is above a threshold; and
determining at least one other frequency of the multiple frequencies is associated with a phase of the acoustic receive signal having another peak-to-average ratio that is above the threshold.

6. A device comprising:
at least one transducer configured to:
transmit a first acoustic transmit signal that propagates within at least a portion of an ear canal of a person, the first acoustic transmit signal having multiple frequencies;
receive an acoustic receive signal, the acoustic receive signal representing a version of the first acoustic transmit signal with one or more characteristics modified due to the propagation within the ear canal; and
transmit a second acoustic transmit signal that propagates within at least the portion of the ear canal of the person, the second acoustic transmit signal having a subset of the multiple frequencies; and
at least one processor configured to:
select, prior to the transmission of the second acoustic transmit signal, the subset of the multiple frequencies based on the one or more modified characteristics of the acoustic receive signal.

7. The device of claim 6, further comprising:
a speaker; and
an active-noise-cancellation circuit comprising a feedback microphone,
wherein the at least one transducer comprises the speaker and the feedback microphone.

8. The device of claim 6, wherein:
the at least one transducer comprises a speaker and a microphone;
the speaker is configured to be positioned proximate to a first ear of the person; and
the microphone is configured to be positioned proximate to a second ear of the person.

9. The device of claim 6, further comprising:
two hearables positioned proximate to different ears of the person, the two hearables each comprising the at least one transducer and the at least one processor,
wherein the two hearables are configured to transmit acoustic signals having different sets of tones.

10. The device of claim 6, wherein the device comprises at least one earbud.

11. The device of claim 6, wherein a quantity of the subset of the multiple frequencies is less than a quantity of the multiple frequencies.

12. The device of claim 6, wherein the at least one transducer is further configured to transmit the second acoustic transmit signal such that the second acoustic transmit signal has a higher amplitude at each frequency within the subset of the multiple frequencies compared to an amplitude of the first acoustic transmit signal at each of the multiple frequencies.

13. The device of claim 6, wherein the at least one transducer is further configured to transmit the second acoustic transmit signal such that the second acoustic transmit signal has a longer duration at each frequency within the subset of the multiple frequencies compared to a duration of the first acoustic transmit signal at each of the multiple frequencies.

14. The device of claim 6, wherein the at least one processor is further configured to:

determine that at least one frequency of the multiple frequencies is associated with an amplitude of the acoustic receive signal having a peak-to-average ratio that is above a threshold;

determine at least one other frequency of the multiple frequencies is associated with a phase of the acoustic receive signal having another peak-to-average ratio that is above the threshold; and select the subset of the multiple frequencies such that the subset of the multiple frequencies comprises the at least one frequency and the at least one other frequency.

15. The method of claim 1, further comprising:

receiving a second acoustic receive signal that represents a version of the second acoustic transmit signal with one or more characteristics modified due to the propagation within the ear canal; and determining a heart rate variability of the person based on the one or more modified characteristics of the second acoustic receive signal, wherein:

the determining of the heart rate variability of the person comprises:

generating a down-converted signal based on the second acoustic receive signal by mixing a digital version of the second acoustic receive signal with a digital version of the second acoustic transmit signal using an in-phase and quadrature mixer;

generating a filtered signal based on the down-converted signal by passing the down-converted signal through a low-pass filter; and measuring the heart rate variability based on peaks within at least one of an amplitude or a phase of the filtered signal.

16. The method of claim 15, further comprising:

determining a blood pressure of the person based on the one or more modified characteristics of the second acoustic receive signal.

17. The method of claim 16, wherein the determining of the blood pressure of the person comprises:

detecting occurrences of a dicrotic notch within at least one of an amplitude or a phase of a version of the acoustic receive signal; and measuring the blood pressure of the person based on the occurrences of the dicrotic notch.

18. The method of claim 1, wherein the first acoustic transmit signal and the second acoustic transmit signal each comprise an ultrasound signal having frequencies between approximately twenty kilohertz and two megahertz.

19. The method of claim 1, further comprising:

transmitting audible content during at least a portion of time that the first acoustic transmit signal and the second acoustic transmit signal are transmitted.

20. A non-transitory computer-readable storage medium comprising instructions that, when executed by a processor, cause a hearable to:

transmit a first acoustic transmit signal that propagates within at least a portion of an ear canal of a person, the first acoustic transmit signal having multiple frequencies;

receive an acoustic receive signal, the acoustic receive signal representing a version of the first acoustic transmit signal with one or more characteristics modified due to the propagation within the ear canal;

select a subset of the multiple frequencies based on the one or more modified characteristics of the acoustic receive signal; and transmit a second acoustic transmit signal that propagates within at least the portion of the ear canal of the person, the second acoustic transmit signal having the subset of the multiple frequencies.

* * * * *